United States Patent
Inoue

(10) Patent No.: US 9,234,592 B2
(45) Date of Patent: Jan. 12, 2016

(54) BRUSH SEAL DEVICE

(71) Applicant: EAGLE INDUSTRY CO., LTD., Tokyo (JP)

(72) Inventor: Hideyuki Inoue, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 14/424,294

(22) PCT Filed: Feb. 6, 2014

(86) PCT No.: PCT/JP2014/052779
§ 371 (c)(1),
(2) Date: Feb. 26, 2015

(87) PCT Pub. No.: WO2014/123192
PCT Pub. Date: Aug. 14, 2014

(65) Prior Publication Data
US 2015/0345640 A1    Dec. 3, 2015

(30) Foreign Application Priority Data

Feb. 6, 2013    (JP) .................................. 2013-021526

(51) Int. Cl.
*F16J 15/22*    (2006.01)
*F16J 15/32*    (2006.01)
*F01D 11/00*    (2006.01)
*F02C 7/28*    (2006.01)

(52) U.S. Cl.
CPC .............. *F16J 15/3288* (2013.01); *F01D 11/00* (2013.01); *F02C 7/28* (2013.01); *F16J 15/3268* (2013.01)

(58) Field of Classification Search
CPC ........................... F16J 15/3284; F16J 15/3288
See application file for complete search history.

(56) References Cited

U.S. PATENT DOCUMENTS

| | | | |
|---|---|---|---|
| 5,110,033 A | 5/1992 | Noone et al. | |
| 5,114,159 A * | 5/1992 | Baird | ........................ F01D 5/10 277/355 |
| 5,176,389 A | 1/1993 | Noone et al. | |
| 7,093,835 B2 * | 8/2006 | Addis | .................. F01D 11/005 277/355 |
| 8,317,464 B2 | 11/2012 | Alamsetty et al. | |
| 2004/0012149 A1 | 1/2004 | Laurello et al. | |
| 2011/0200432 A1 | 8/2011 | Alamsetty et al. | |
| 2012/0251303 A1 | 10/2012 | Zheng et al. | |

FOREIGN PATENT DOCUMENTS

| | | |
|---|---|---|
| EP | 500486 A1 | 8/1992 |
| JP | H04-318232 A | 11/1992 |
| JP | 2011-169319 A | 9/2011 |

OTHER PUBLICATIONS

International Search Report for PCT/JP2014/052779, ISA/JP, mailed Apr. 8, 2014.

* cited by examiner

*Primary Examiner* — Gilbert Lee
(74) *Attorney, Agent, or Firm* — Harness, Dickey & Pierce, PLC

(57) ABSTRACT

The present invention is to provide a brush seal device capable of following displacement in a radial direction of a rotational shaft appropriately. The brush seal device prevents leakage of process fluid, wear of a brush seal etc., and leakage of process fluid from an outer circumferential side. The brush seal device 100 of the present invention includes an inner circumferential brush seal 120 and an outer circumferential brush seal 140. The inner circumferential brush seal 120 has a brush portion 123 and a free end portion 125 at the inner circumferential side. The outer circumferential brush seal 140 is placed at an outer circumferential side of the inner circumferential brush seal 120, and has a brush portion 143 and a free end portion 145 at the inner circumferential side.

8 Claims, 13 Drawing Sheets

BRUSH SEAL DEVICE

CROSS-REFERENCE TO RELATED APPLICATIONS

This application is a 371 U.S. National Stage of International Application No. PCT/JP2014/052779, filed Feb. 6, 2014, which claims priority to Japanese Patent Application No. 2013-021526, filed Feb. 6, 2013. The entire disclosures of the above applications are incorporated herein by reference.

TECHNICAL FIELD

The present invention relates to a brush seal device which seals a clearance between a rotational shaft of such as gas turbines and a mating component such as a housing relatively moving to the rotational shaft. The brush seal device includes a brush portion where a plurality of bristles are arranged.

BACKGROUND ART

Brush seal devices which have a brush portion made of multiple bristles are effective because the brush portion is deformed in accordance with movement of a rotational shaft and free end portions of tips of the bristles can follow a circumferential surface of the rotational shaft even if the rotational shaft is slightly moved in a radial direction.

However, when the bristles of a brush seal are pressed by movement of the rotational shaft, it is extremely difficult to control friction force applied thereto in an optimum state. This is because the friction force is affected by spring constant for elastic deformation of the bristles, complex friction force resulting from mounting structure of the bristles, and the like.

When the bristles do not properly follow the displacement of the rotational shaft, space occurs between the bristles and the rotational shaft. Then, this leads to leakage of process fluid or to an early wear of the free end portions of the bristles or a circumferential surface of the rotational shaft.

As a brush seal device to overcome such a problem, that is, as a brush seal device having a higher following ability and less wear, one having a floating-type brush seal body to enable a relatively large movement in the radial direction is known. A brush seal with a plate spring at an outer circumference, which can prevent eccentricity even if space occurs between a rotor and the brush seal due to wear thereof, is also known (for example, see Japanese Laid-Open Patent Publication No. 2011-169319 (Patent Document 1)).

However, for example, in a structure with a floating-type brush seal body or a structure with a plate spring at an outer circumference as shown in Patent Document 1, the outer circumference is not sufficiently sealed. Thus, a secondary seal surface is needed to prevent leakage from the outer circumference. However, in this structure, the outer circumferential side and a portion of the secondary seal are directly exposed to the outer circumferential leakage, which then increases the cost for a sealing ability. In order to prevent the leakage of the secondary seal surface, a high-performance secondary seal is needed to be placed. Thus, in this respect, the cost is also increased. Further, the following ability for the rotational shaft is desired to be improved greatly.

PRIOR ART

Patent Document

Patent document 1: Japanese Laid-Open Patent Publication No. 2011-169319

SUMMARY OF THE INVENTION

Problems to be Solved by the Invention

The present invention has been achieved to solve such a disadvantage, and its object is to provide a brush seal device achieving the following advantages: The brush seal device can appropriately follow vibration, movement in a radial direction of eccentricity of a rotational shaft or the like with a proper pressure not to be excessive, and as a result, it is possible to prevent leakage of process fluid resulting from gaps between the rotational shaft and a brush seal and to prevent the wear of the brush seal, the rotational shaft, a housing or the like; the brush seal device can appropriately prevent or suppress the leakage from an outer circumferential side without a high-performance secondary seal; and the brush seal device can further appropriately maintain function and effect thereof for a long time.

Solution to Problem

In order to solve the above-mentioned problems, the brush seal device of the present invention has a brush portion in which a plurality of bristles are arranged and sealing in an axial direction between a housing and a rotational shaft, the brush seal device comprising:
  an inner circumferential brush seal part having an inner circumferential brush seal; and
  an outer circumferential brush seal part having an outer circumferential brush seal, wherein
  said inner circumferential brush seal comprises:
  an attachment section provided at an outer circumferential side;
  a brush portion in which a plurality of bristles are arranged from the attachment section to an inner circumferential direction; and
  a free end portion which is an inner-circumferential-side end portion of the brush portion and is arranged opposite to an outer circumferential surface of the rotational shaft so as to contact or be adjacent to the outer circumferential surface, and
  said outer circumferential brush seal comprises:
  an attachment section provided at an outer circumferential side;
  a brush portion in which a plurality of bristles are arranged from the attachment section to an inner circumferential direction; and
  a free end portion which is an inner-circumferential-side end portion of the brush portion and is arranged opposite to an outer circumferential surface of the inner circumferential brush seal part so as to contact or be adjacent to the outer circumferential surface.

According to the present invention with such a structure, the following brush seal device can be provided: The brush seal device can appropriately follow vibration, movement in a radial direction of eccentricity of a rotational shaft or the like with a proper pressure not to be excessive, and as a result, it is possible to prevent leakage of process fluid resulting from gaps between the rotational shaft and a brush seal and to prevent the wear of the brush seal, the rotational shaft, a housing or the like; the brush seal device can appropriately prevent or suppress the leakage from an outer circumferential side without a high-performance secondary seal; and the brush seal device can further appropriately maintain function and effect thereof for a long time.

Preferably, at least one of said inner circumferential brush seal and said outer circumferential brush seal is a brush seal having a seal part and the free end portion formed on an inner circumferential side of a plurality of wire members bundled and arranged in a wall shape along a circumference and formed into a ring shape by welding an outer end portion of the wire members combined to one another.

Also, preferably, at least one of said inner circumferential brush seal and said outer circumferential brush seal comprises a plurality of plate brush seal unit discs integrally formed by axially laminating themselves, the plate brush seal unit disc comprises:
the attachment section;
the brush portion having narrow beams as the bristles extending from the attachment section to an inner circumferential side and inclined with respect to a circumferential direction; and
the free end portion.

Also, preferably, the brush portion of the inner circumferential brush seal and the brush portion of the outer circumferential brush seal are composed of bristles of the same material.

Also, preferably, the brush portion of the inner circumferential brush seal and the brush portion of the outer circumferential brush seal are composed of bristles of different materials.

Also, preferably, a plurality of the bristles of the inner-circumferential-side brush portion of the inner circumferential brush seal are arranged toward an inner circumferential direction to be inclined with respect to a radial direction, a plurality of the bristles of the outer-circumferential-side brush portion of the outer circumferential brush seal are arranged toward an inner circumferential direction to be inclined with respect to a radial direction, and the bristles of the inner circumferential brush seal and the bristles of the outer circumferential brush seal are inclined oppositely with respect to the radial direction.

Also, preferably, the brush seal device further comprises a brush receiving part placed on the outer circumferential surface of the inner circumferential brush seal part so as to contact or be adjacent to the free end portion of the outer circumferential brush seal and to restrict a spreading out in an axial direction of the free end portion of the outer circumferential brush seal.

Also, preferably, the outer circumferential brush seal is formed to be inclined with respect to the axial direction of the rotational shaft.

MODES FOR CARRYING OUT THE INVENTION

First Embodiment

A brush seal device of the first embodiment of the present invention will be explained with reference to FIG. 1 to FIG. 4.

Figure 1:
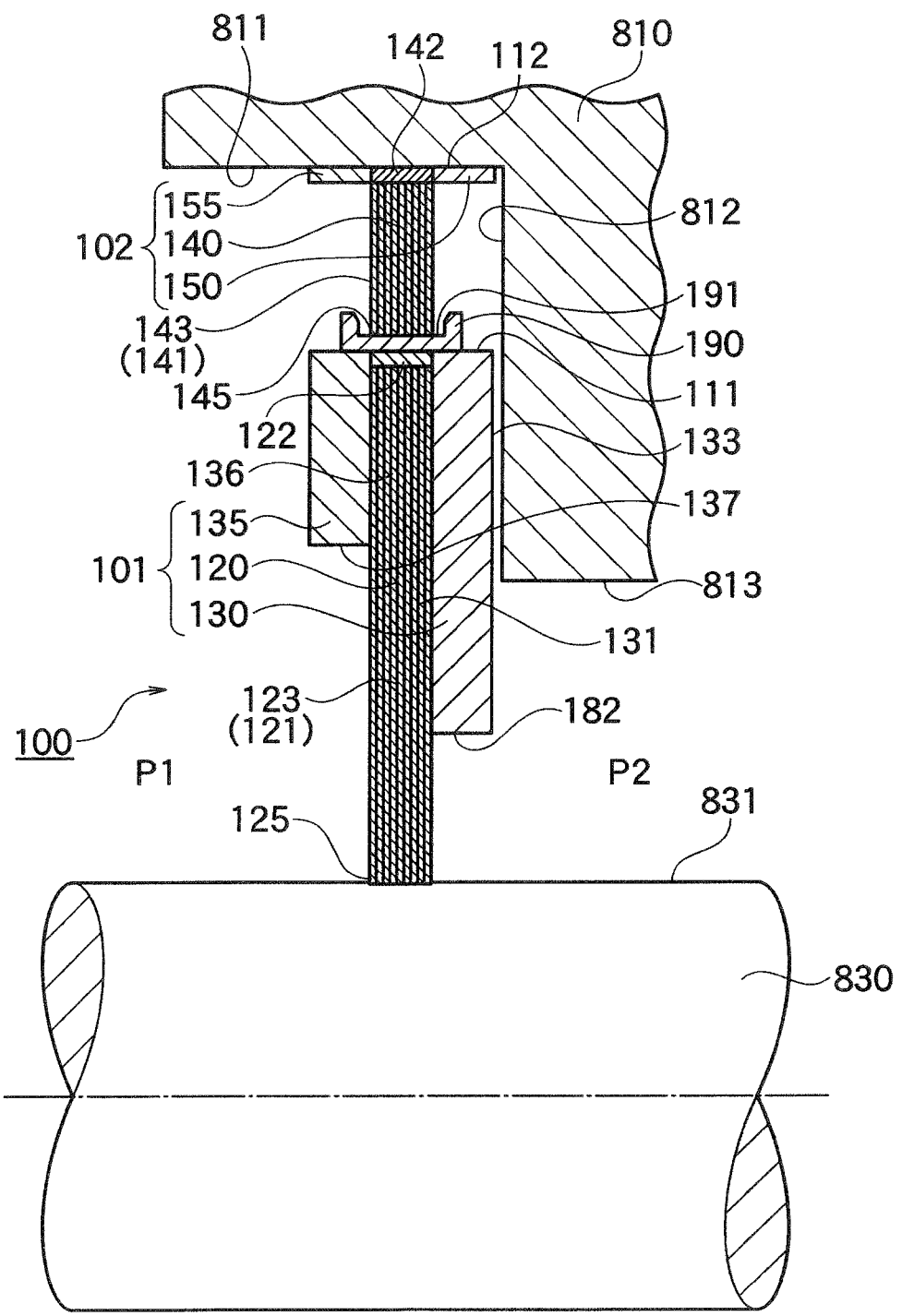
FIG. 1 is a cross sectional view showing a structure of a brush seal device of the first embodiment of the present invention.
Figure 2A:
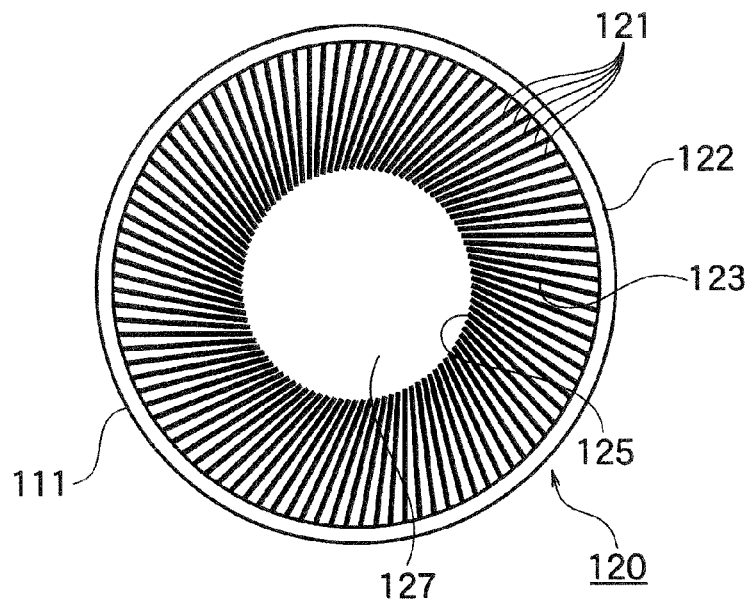
FIG. 2A is a plane view of an inner circumferential brush seal providing an inner circumferential brush seal part of the brush seal device shown in FIG. 1.
Figure 2B:
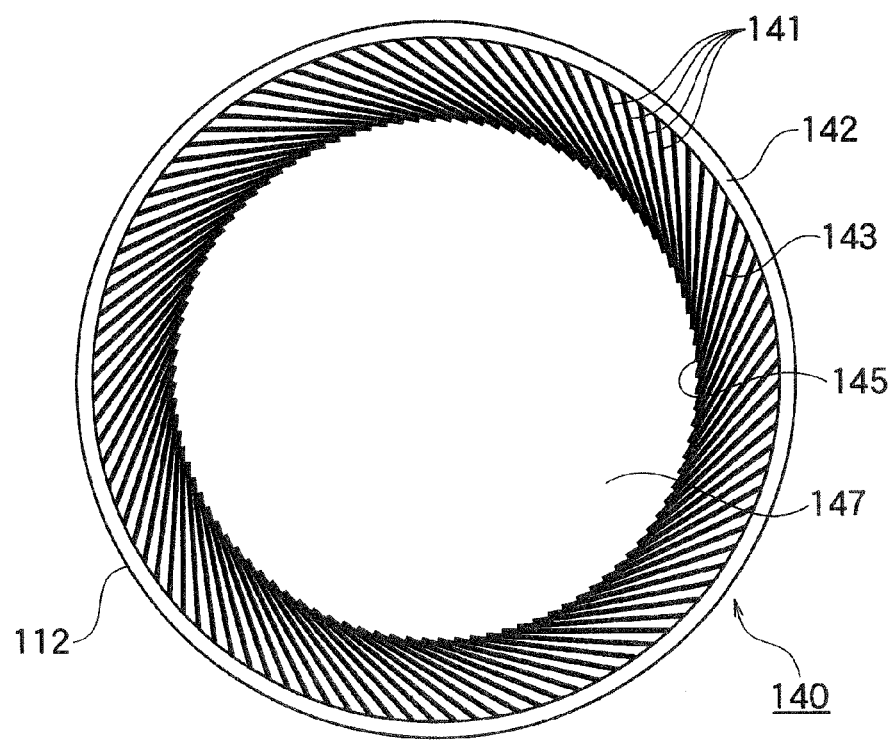
FIG. 2B is a plane view of an outer circumferential brush seal providing an outer circumferential brush seal part of the brush seal device shown in FIG. 1.
Figure 3:
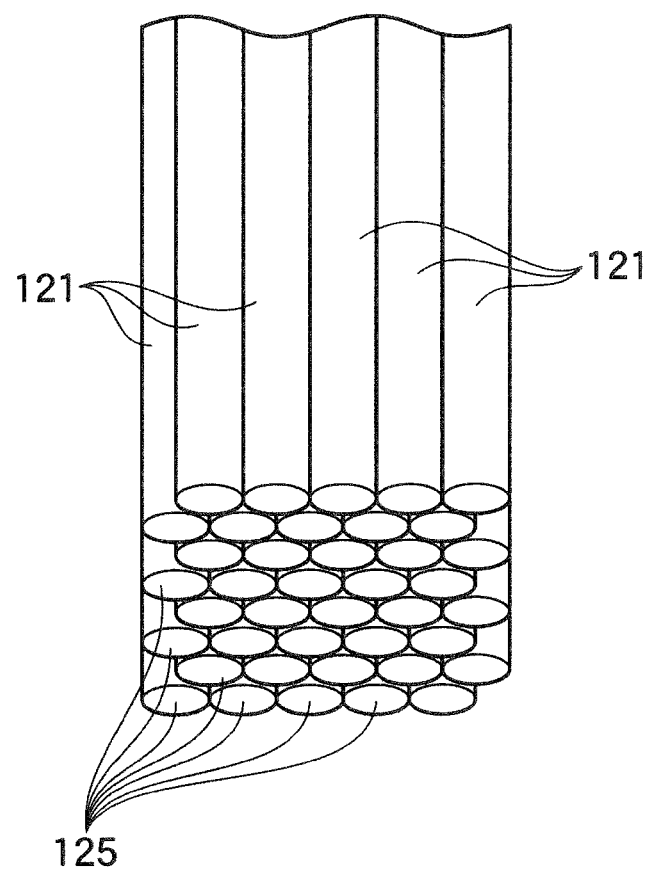
FIG. 3 is a perspective view showing a form of free end portions of an inner circumferential brush seal of the inner circumferential brush seal part of the brush seal device shown in FIG. 1.
Figure 4:
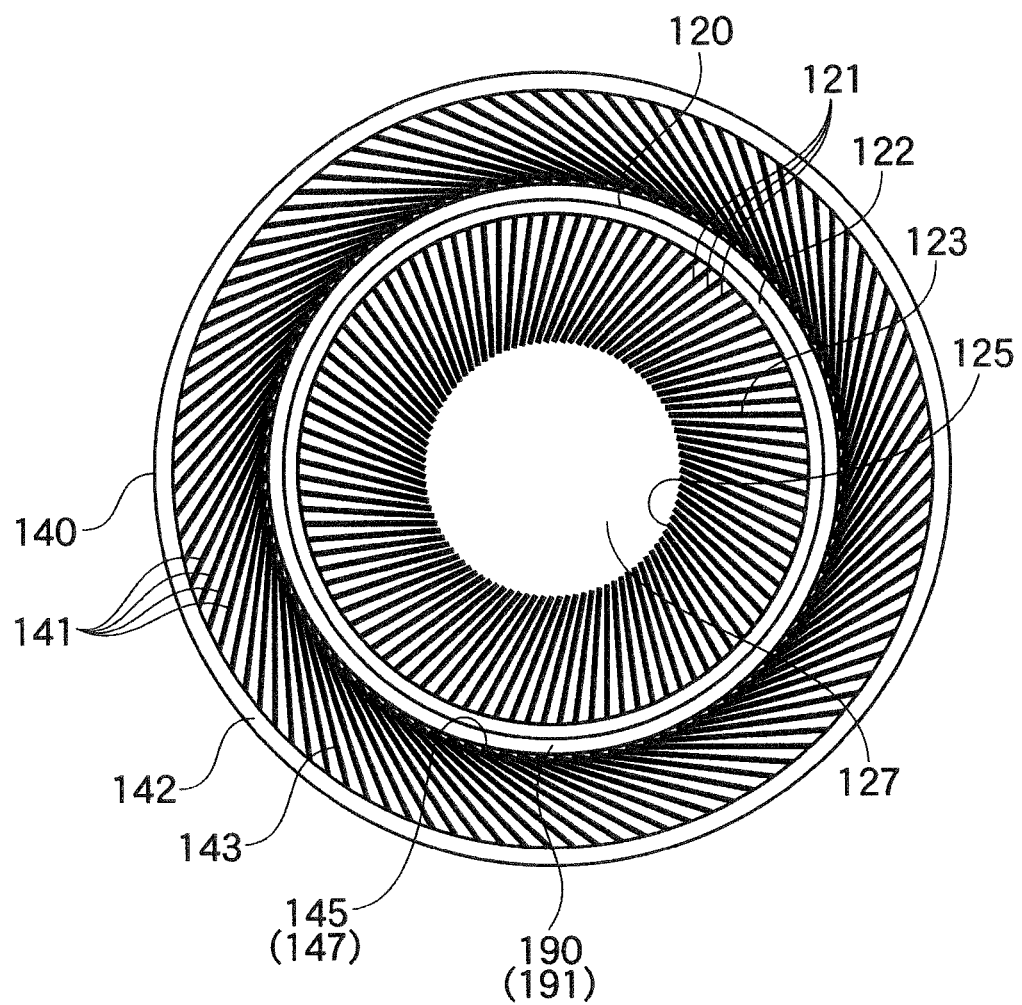
FIG. 4 is a radial-directional cross sectional view of the inner and outer circumferential brush seals of the two-stage inner and outer circumferential brush seal parts of the brush seal device shown in FIG. 1.

FIG. 1 is a cross sectional view showing a structure of a brush seal device 100 of the first embodiment of the present invention. FIG. 2A is a plane view of an inner circumferential brush seal 120 of an inner circumferential brush seal part 101 of the brush seal device 100. FIG. 2B is a plane view of an outer circumferential brush seal 140 of an outer circumferential brush seal part 102 of the brush seal device 100. FIG. 3 is a perspective view showing a form of free end portions 125 of the inner circumferential brush seal 120. FIG. 4 is a radial-directional cross sectional view of the inner and outer circumferential brush seals 120 and 140 of the brush seal device 100.

The brush seal device 100 is one used to be arranged in a gas turbine, for example. As shown in FIG. 1, the brush seal device 100 is placed in a gap between a housing 810 and a rotational shaft 830 and divides the gap into a higher pressure side P1 and a lower pressure side P2. The brush seal device 100 is attached to a step shoulder 812 provided on an inner circumferential surface 811 of the housing 810.

The brush seal device 100 has an inner circumferential brush seal part 101 and an outer circumferential brush seal part 102. The inner circumferential brush seal part 101 and the outer circumferential brush seal part 102 have brush portions 123 and 143 at the inner circumferential side, and the tips (the inner-circumferential-side end portions) are formed at the free end portions 125 and 145, respectively.

In the inner circumferential brush seal part 101, the free end portions 125 are arranged opposite to an outer circumferential surface 831 of the rotational shaft 830 so as to contact or be adjacent to the outer circumferential surface 831. In the outer circumferential brush seal part 102, the free end portions 145 are arranged opposite to an outer circumferential surface 111 of the inner circumferential brush seal part 101 so as to contact or be adjacent to the outer circumferential surface 111 at the outer circumferential side of the inner circumferential brush seal part 101. An outer circumferential surface 112 of the outer circumferential brush seal part 102 is closely fitted with the inner circumferential surface 811 of the housing 810.

In the brush seal device 100, the two-stage brush seal of the inner circumferential brush seal part 101 and the outer circumferential brush seal part 102 axially seals process fluid at the higher pressure side P1 in a space between the housing 810 and the rotational shaft 830.

The inner circumferential brush seal part 101 has the inner circumferential brush seals 120, a back plate part 130, and a holding part 135.

As shown in FIG. 1 and FIG. 2A, the inner circumferential brush seal 120 is formed into a ring shape by bundling multiple linear bristles 121, arranging the bundled bristles 121 in a wall shape along a circumference, and bonding an outer circumferential side with welding. A ring-shaped welding part at the outer circumferential side is formed as an attachment section 122. An inner circumferential side thereof is formed as a brush portion 123. End portions at the inner circumferential side are formed as the free end portions 125, which contact or are adjacent to the outer circumferential surface 831 of the rotational shaft 830.

As shown in FIG. 2A, each of the bristles 121 has a linear shape and is arranged to be inclined toward the rotational direction of the rotational shaft 830 with respect to a radial direction of the rotational shaft 830 at a predetermined angle. The rotational shaft 830 is fitted with a ring space 127 to be inside of the free end portions 125 of the inner circumferential brush seal 120 arranged in such a way. Thus, the inner circumferential brush seal 120 is formed so that an inner diameter of the ring space 127 is approximately the same as an outer diameter of the outer circumferential surface 831 of the rotational shaft 830.

The free end portions 125 of the bristles 121 of the inner circumferential brush seal 120, which form an engagement surface (engagement part) with the rotational shaft 830, are arranged orderly and densely so as not to make a blank space as much as possible and are subjected to a precision finish as shown in FIG. 3.

In the present embodiment, the bristles 121 are made of steel, nickel-base alloy, or ceramic material etc., and are wire members whose cross sections are circular. The diameter of the bristle 121 is 0.5 to 0.005 mm, and preferably 0.20 to 0.02 mm.

Note that, the bristle 121 may have an optional shape on the presumption that function, movement, or effect etc. described in the present specification can be demonstrated. For example, the bristle 121 may be a member having an optional cross sectional form other than a circular shape such as a wire member having a rectangular cross section, or may be a member having a diameter other than the above range. Also, the bristle may be one whose cross sectional shape, cross sectional size (diameter) or the like changes. Further, the bristles 121 may be used by mixing some bristles having such a different shape or form in multiple bristles.

As shown in FIG. 1, the back plate part 130 is an annular plate member placed at the lower pressure side P2 of the inner circumferential brush seal 120. The back plate part 130 is placed so that a side surface 131 is contacted to the bristles 121 of the inner circumferential brush seal 120, and supports the bristles 121 from the lower pressure side P2 to receive pressure of process fluid.

An opening 132, which makes the rotational shaft 830 go through, is formed on the central position of the back plate part 130. The opening 132 has a diameter which is large enough not to be contacted even if the rotational shaft 830 moves in the axial direction due to vibration or eccentricity etc. thereof. On the other hand, from a perspective of supporting the bristles 121 appropriately and preventing leakage of the process fluid, the opening 132 is formed to have a diameter which is smaller than that of an inner-side inner circumferential surface 813 of the step shoulder 812 of the housing 810 or an opening 137 of the holding part 135 mentioned later.

Note that, a secondary seal may be formed between the brush seal device 100 and the housing 810 on a side surface 133 at the lower pressure side P2 of the back plate part 130. In that case, the side surface 133 is constituted as a secondary seal surface.

The holding part 135 is an annular plate member placed at the higher pressure side P1 of the inner circumferential brush seal 120. In the holding part 135, a side surface 136 is placed to be contacted to the bristles 121 of the inner circumferential brush seal 120, and an opening 187 for making the rotational shaft 830 go through is formed on the central position thereof. The opening 137 is formed to have a diameter which is sufficiently larger than that of the opening 132 of the back plate part 130 in order to respond to such as deformation of the bristles 121 when the rotational shaft 830 contacts to the inner circumferential brush seal 120, the contact state is changed, or the like due to vibration, eccentricity or so.

The back plate part 130 and the holding part 135 are integrally formed with the inner circumferential brush seal 120 to hold it therebetween. That is, the back plate part 130, the attachment section 122 of the inner circumferential brush seal 120, and the holding part 135 are welded so that the attachment section 122 of the inner circumferential brush seal 120 is positioned at center, and they are combined as in the trinity. Consequently, the inner circumferential brush seal part 101 is constituted as a whole.

Note that, a brush receiving part 190 mentioned below is placed on the outer circumferential surface 111 of the inner circumferential brush seal part 101, where the back plate part 130, the inner circumferential brush seal 120, and the holding part 135 are integrated.

As shown in FIG. 4, the inner circumferential brush seal part 101 is fitted with a ring space 147 through the brush receiving part 190. The ring space 147 is the inside of the free end portions 145 of the outer circumferential brush seal 140 of the outer circumferential brush seal part 102. Thus, the outer diameter of the inner circumferential brush seal part 101, that is, the outer diameter of the inner circumferential brush seal 120, the back plate part 130, and the holding part 135 is approximately the same as the inner diameter of the ring space 147 of the outer circumferential brush seal part 102 mentioned below.

The back plate part 130 and the holding part 135 are manufactured by an optional material such as nickel-base alloy, iron, steel, or other nonferrous metals. In terms of the back plate part 130 and the holding part 135, a preferable material is properly selected by considering such as type, temperature or other conditions of process fluid, or material or structure of the bristles 121 or the attachment section 122 of the inner circumferential brush seal 120.

As shown in FIG. 1, the outer circumferential brush seal part 102 has the outer circumferential brush seal 140, a first holding part 150, a second holding part 155 and the brush receiving part 190. The outer circumferential brush seal part 102 is basically constituted in the same way as the inner circumferential brush seal part 101 mentioned above. However, they are different in size of each part, inclined direction of the bristles 141, structure and function of the holding parts 150 and 155, presence of the brush receiving part 190, and the like.

As shown in FIG. 1 and FIG. 2B, the outer circumferential brush seal 140 is formed into a ring shape by bundling the multiple linear bristles 141, arranging the bundled bristles 141 in a wall shape along the circumference, and bonding the inner circumferential side with welding in the same way of the inner circumferential brush seal 120. A ring-shaped welding part at the outer circumferential side is formed as an attachment section 142. The inner circumferential side thereof is formed as the brush portion 143. The ends of the bristles 141 at the inner circumferential side are formed as the free end portions 145, which contact or are adjacent to the brush receiving part 190 placed on the outer circumferential surface 111 of the inner circumferential brush seal part 101.

In the outer circumferential brush seal 140, as shown in FIG. 4, the inner circumferential brush seal part 101 is fitted in the ring space 147, which is the inside of the free end portions 145. Thus, the inner diameter of the ring space 147 arranged at the inside of the free end portions 145 of the outer circumferential brush seal 140 is formed to be approximately the same as the outer diameter of the outer circumferential surface 111 of the inner circumferential brush seal part 101.

The bristles 141 have substantially the same material, cross sectional shape, cross sectional size, arrangement density and arrangement form as those of the bristles 121 of the inner circumferential brush seal 120 mentioned above.

Note that, in the outer circumferential brush seal 140, the bristles 141 are inclined in an opposite direction to a direction where the bristles 121 of the inner circumferential brush seal 120 are inclined along the circumferential direction with respect to the radial direction of the rotational shaft 830, that is, the radial direction of the inner circumferential brush seal part 101 or the outer circumferential brush seal part 102. Note that, function and effect of such a structure will be mentioned later.

As shown in FIG. 1, the first holding part 150 is an annular member placed at the lower pressure side P2 of the attachment section 142 of the outer circumferential brush seal 140. The second holding part 155 is an annular member placed at the higher pressure side P1 of the attachment section 142 of the outer circumferential brush seal 140. The first holding part 150 and the second holding part 155 are integrally formed with the outer circumferential brush seal 140 by holding it therebetween. That is, the first holding part 150, the attachment section 142 of the outer circumferential brush seal 140, and the second holding part 155 are welded so that the attachment section 142 of the outer circumferential brush seal 140 is positioned at center, and they are combined as in the trinity. As a result, the main part of the outer circumferential brush seal part 102 is constituted as a whole.

When the outer circumferential brush seal part 102 is placed on the housing 810, in other words, when the brush seal device 100 is placed on the housing 810, the outer circumferential surface 112 of the integrated first holding part 150, outer circumferential brush seal 140 and second holding part 155 is formed as an engagement surface closely engaged with the inner circumferential surface 811 of the housing 810. Thus, the outer diameter of the outer circumferential brush seal part 102, that is, the outer diameter of the outer circumferential brush seal 140, the first holding part 150 and the second holding part 155 is formed to be approximately the same as the inner diameter of the inner circumferential surface 811 of the housing 810.

The brush receiving part 190 is a cylindrical member engaged and placed on the outer circumferential surface of the inner circumferential brush seal part 101, and is a spreading restriction member for restricting spreading of the free end portions 145 of the bristles 141 of the outer circumferential brush seal 140. A concave 191 is formed on the brush receiving part 190 toward the outer diameter direction, that is, on the outer circumferential surface thereof. The concave 191 is a passage of the bristles 141 of the outer circumferential brush seal part 102 so that the free end portions 145 of the outer circumferential brush seal 140 are arranged to be close to, contact to, or slide to the concave 191. Both end portions in the axial direction of the concave 191 annularly protrude in the outer diameter direction, and restrict the movement of the free end portions 145 of the outer circumferential brush seal 140 so that they do not protrude to the outside of the concave 191.

The above-mentioned brush receiving part 190 is placed against the free end portions 145 of the outer circumferential brush seal 140, so that it is possible to restrict spreading of the free end portions 145 of the bristles 141 of the outer circumferential brush seal 140 and to enable the free end portions 145 to be arranged orderly and densely for a long time. In particular, as the present embodiment shown in FIG. 1, the outer circumferential brush seal part 102 with no member pressing side surface of the bristles 141 like the back plate part 130 and the holding part 135 of the inner circumferential brush seal part 101 has a possibility that the free end portions 145 of the outer circumferential brush seal 140 are spread (especially, to the radial direction). However, the brush receiving part 190 is provided, so that the free end portions 145 can be prevented from spreading. As a result, it is possible to prevent lowering of eccentricity prevention function of the brush seal device 100 caused by spreading of the free end portions 145 of the outer circumferential brush seal 140 and to enable the brush seal device 100 to be properly operated for a long time.

Also, with the brush receiving part 190, it is possible to prevent wear of the outer circumferential surface 111 of the inner circumferential brush seal part 101 caused by directly sliding the free end portions 145 of the outer circumferential brush seal 140.

As with the back plate part 130 and the holding part 135 of the inner circumferential brush seal part 101, the first holding part 150, the second holding part 155 and the brush receiving part 190 are also made from an optional material such as nickel-base alloy, iron, steel, or other nonferrous metals. A preferable material is properly selected for these members by considering type, temperature or other conditions of process fluid, or by considering material, structure or so of the bristles 141 or the attachment section 142 of the outer circumferential brush seal 140.

The brush seal device 100 having the inner circumferential brush seal part 101 and the outer circumferential brush seal part 102 with such structures is placed between the inner circumferential surface 811 of the housing 810 and the rotational shaft 830 as a brush seal device having an inner and outer circumferential two-stage brush seal as shown in FIG. 1.

In the brush seal device 100, the inner circumferential brush seal part 101 and the outer circumferential brush seal part 102 can be integrally formed in advance, and the integrally formed brush seal device 100 can be placed between the housing 810 and the rotational shaft 830. In that case, a setting member, which is attached between the inner circumferential brush seal part 101 and the outer circumferential brush seal part 102 to integrally hold them, may be used based on necessity until the brush seal device 100 is placed on the inner circumferential surface 811 of the housing 810. The setting member is detached after the brush seal device 100 is placed on the inner circumferential surface 811 of the housing 810 or at a subsequent actual operation stage, and the inner circumferential brush seal part 101 and the outer circumferential brush seal part 102 can be moved relatively.

Instead, in the brush seal device 100, the inner circumferential brush seal part 101 and the outer circumferential brush seal part 102 may be separately prepared before the brush seal device 100 is placed (the brush receiving part 190 is preferably placed on the outer circumferential surface 111 of the inner circumferential brush seal part 101), and they may be assembled when the brush seal device 100 is placed between the housing 810 and the rotational shaft 830.

In that case, firstly, the outer circumferential brush seal part 102 may be placed on the inner circumferential surface 811 of the housing 810, and the inner circumferential brush seal part 101 may be then placed on the outer circumferential surface 831 of the rotational shaft 830 in the ring space 127 of the outer circumferential brush seal part 102. Alternatively, firstly, the inner circumferential brush seal part 101 may be placed on the outer circumferential surface 831 of the rotational shaft 830, and thereafter the outer circumferential brush seal part 102 may be placed inside of the inner circumferential surface 811 of the housing 810.

The brush seal device 100 of the present embodiment with such a structure further provides the outer circumferential brush seal 140 at the outer circumferential side of the inner circumferential brush seal 120. Thus, it is possible to seal process fluid at the outer circumferential side of the brush seal device 100 and to properly prevent leakage of process fluid from the outer circumferential side of the brush seal device 100.

As a result, a secondary seal provided for preventing leakage of the process fluid at the outer circumferential side of the brush seal device 100 can be unnecessary.

When using the secondary seal simultaneously, it is also possible to properly prevent leakage of the process fluid from a secondary seal surface, to reduce stress of the secondary seal, and to extend its life. Further, it is possible to prevent enhancement of performance required for the secondary seal and to obtain effect such as reduction in cost of devices.

Also, since the brush seal device 100 of the present embodiment has a two-stage brush seal of the inner circumferential brush seal 120 and the outer circumferential brush seal 140, it is possible to improve elastic characteristic (spring property) of the whole brush seal device 100. As a result, even if there is a risk that a space occurs between the rotational shaft 830 and the free end portions 125 of the inner circumferential brush seal 120 due to eccentricity of the rotational shaft 830 or wear of the brush seal (the inner circumferential brush seal 120) etc., the inner circumferential brush seal 120 can properly keep following to the outer circumferential surface 831 of the rotational shaft 830. As a result, it is possible to prevent such a space from occurring and to properly prevent leakage of process fluid.

In the brush seal device 100 of the present embodiment, the bristles 141 of the outer circumferential brush seal 140 are also formed to be inclined with respect to the inner circumferential surface 811 of the housing 810 and the axial direction of the rotational shaft 830, and the brush portion 143 of the outer circumferential brush seal 140 also has eccentricity prevention function based on elastic deformation. As a result, the brush seal device 100 as a whole can more preferably perform eccentricity prevention function for the rotational shaft 830. That is, it is possible to reduce a risk that a space occurs between the rotational shaft 830 and the free end portions 125 of the inner circumferential brush seal 120 and to more preferably perform alignment of the rotational shaft 830 for the brush seal device 100 as a whole.

In the brush seal device 100 of the present embodiment, it is possible to optionally adjust length and angle of the bristles 121 and 141 for each of the inner circumferential brush seal 120 and the outer circumferential brush seal 140. Therefore, it is possible to respectively adjust eccentricity prevention function performed at the inner circumferential brush seal 120 and the outer circumferential brush seal 140 to a proper operation state. In this respect, the brush seal device 100 as a whole can more preferably perform eccentricity prevention function for the rotational shaft 830, and can preferably perform alignment of the rotational shaft 830.

In the brush seal device 100 of the present embodiment, the bristles 141 of the outer circumferential brush seal 140 and the bristles 121 of the inner circumferential brush seal 120 are inclined in different directions with respect to the radial direction of the rotational shaft 830. That structure makes it possible to generate a force of the outer circumferential brush seal 140 in a direction opposite to the direction of a force of the inner circumferential brush seal 120 generated by the rotation of the rotational shaft 830. Thus, each of the inner circumferential brush seal 120 and the outer circumferential brush seal 140 can be made harder to be rotated. As a result, wear due to sliding of the free end portions 125 of the inner circumferential brush seal part 101 and the free end portions 145 of the outer circumferential brush seal part 102 is reduced, and the brush seal device 100 can be properly maintained for a long time.

In the brush seal device 100 of the present embodiment, the bristles 121 and the bristles 141 are formed on the inner circumferential brush seal 120 and the outer circumferential brush seal 140 by joining and welding the outer circumferential side, respectively. Joining and welding the bristles 121 and 141 to provide them as the above make it almost certainly possible to prevent the bristles 121 and 141 from falling off and to form the strong brush portions 123 and 143. As a result, the brush seal device 100 can be properly maintained for a long time.

Note that, in the embodiment mentioned above, the inner circumferential brush seal 120 of the inner circumferential brush seal part 101 and the outer circumferential brush seal 140 of the outer circumferential brush seal part 102 have the same brush portions 123 and 143. However, the inner circumferential brush seal 120 and the outer circumferential brush seal 140 may have the different brush portions 123 and 143. That is, the inner circumferential brush seal 120 and the outer circumferential brush seal 140 may constitute the brush portions 123 and 143 with the bristles 121 and 141, which have different material, diameter, shape (cross sectional shape), characteristic, arrangement density, arrangement form, or the like.

By having such a structure, as the inner circumferential brush seal 120 and the outer circumferential brush seal 140, it is possible to form the brush portions 123 and 143 having various movement conditions and movement characteristics and to form the brush portions 123 and 143 having optimal conditions respectively. As a result, it is possible to provide a brush seal device which is applicable to a wider technical field and performs a higher performance.

In the present embodiment, a ring member whose cross section is concave is used as the brush receiving part 190. However, parts defining a range of the outer-circumferential-side free end portions 145 of the outer circumferential brush seal 140 may be just placed at both side of the range in the axial direction on the outer circumferential surface 111 of the inner circumferential brush seal part 101. As the brush receiving part 190, an optional one may be used as long as it can restrict spreading of the outer-circumferential-side free end portions 145 of the outer circumferential brush seal 140.

Accordingly, according to the first embodiment of the present invention, the following brush seal device 100 is provided: Leakage of process fluid from around a rotational shaft and from an outer circumferential side can be prevented; wear of a brush seal, the rotational shaft, or a housing etc. can be prevented; and these function and effect can be properly maintained for a long time.

Second Embodiment

A brush seal device according to the second embodiment of the present invention will be explained in reference to FIG. 5 to FIG. 8.

Figure 5:
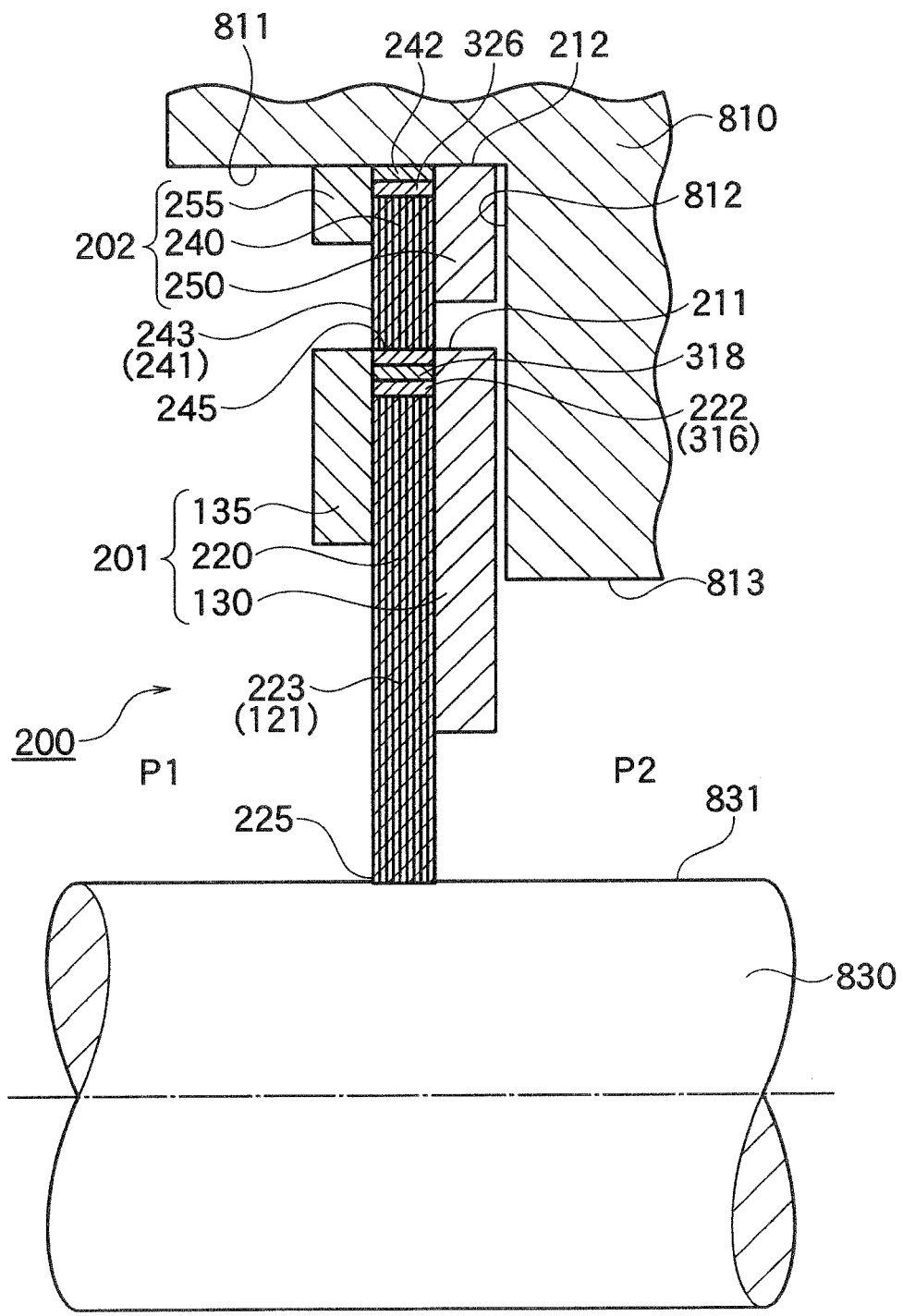
FIG. 5 is a cross sectional view showing a structure of a brush seal device of the second embodiment of the present invention.
Figure 6A:
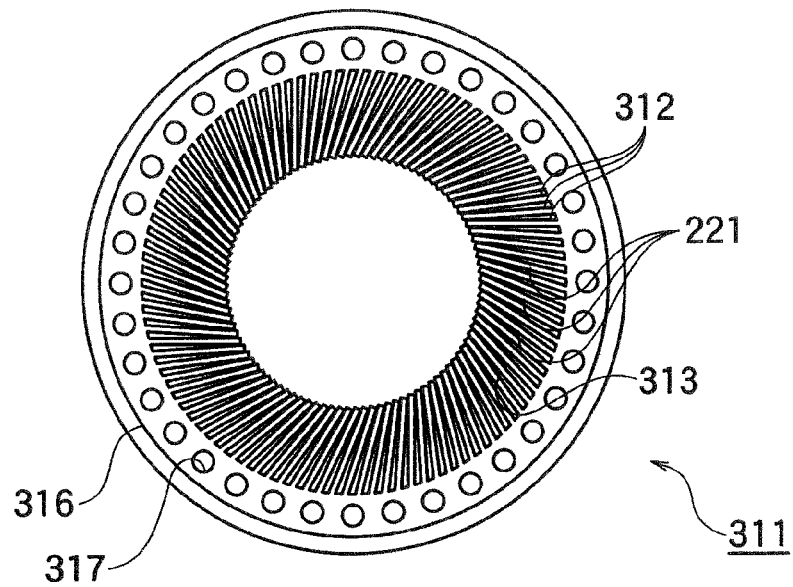
FIG. 6A is a first figure showing a plate brush seal unit disc consisting the brush seal of the brush seal part of the brush seal device shown in FIG. 5, and is a plane view of a plate brush seal unit disc consisting the inner circumferential brush seal of the inner circumferential brush seal part.
Figure 6B:
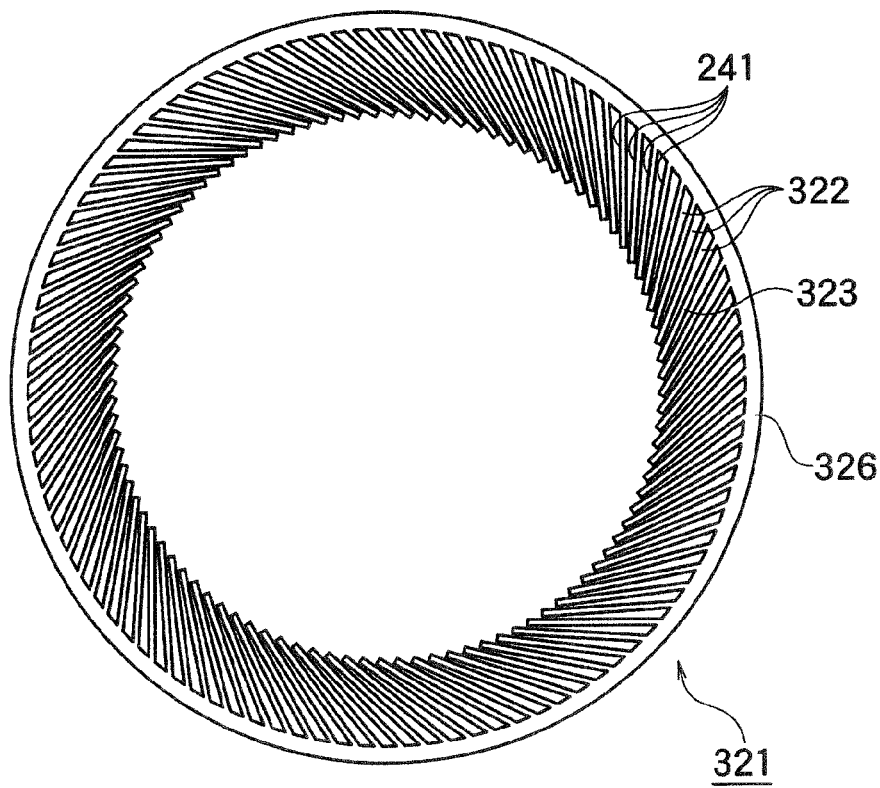
FIG. 6B is a second figure showing a plate brush seal unit disc consisting the brush seal of the brush seal part of the brush seal device shown in FIG. 5, and is a plane view of a plate brush seal unit disc consisting the outer circumferential brush seal of the outer circumferential brush seal part.
Figure 7:
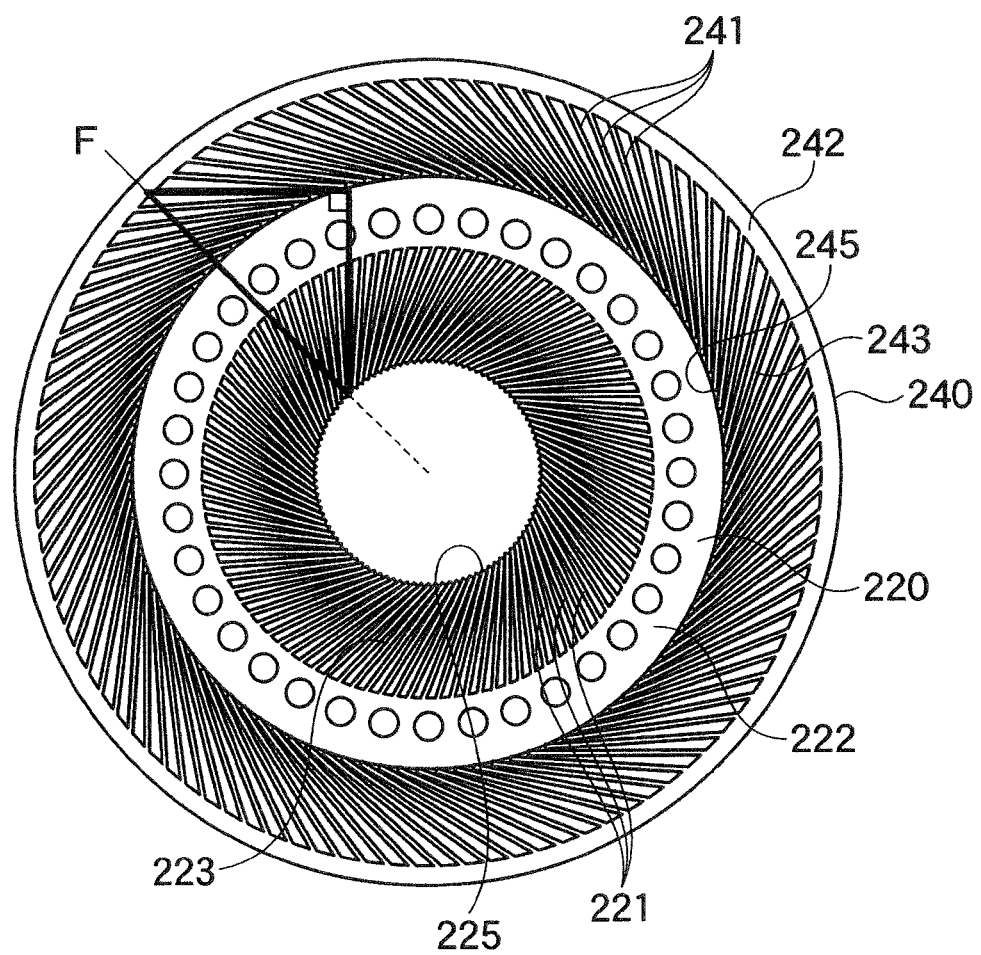
FIG. 7 is a radial-directional cross sectional view of the inner and outer circumferential brush seals of the two-stage inner and outer circumferential brush seal parts of the brush seal device shown in FIG. 5.
Figure 8A:
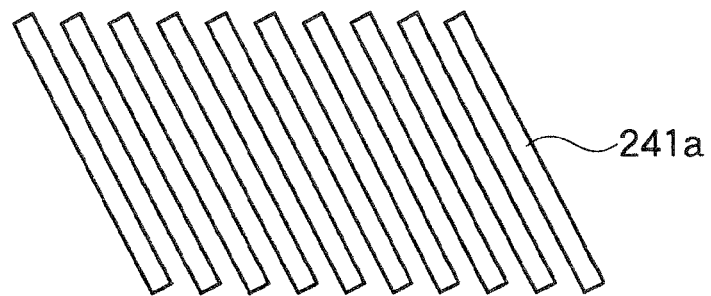
FIG. 8A is a first figure to explain a method for overlapping narrow beams at an inner circumferential brush seal shown in FIG. 6A, and the first figure shows a pattern of first narrow beams.
Figure 8B:
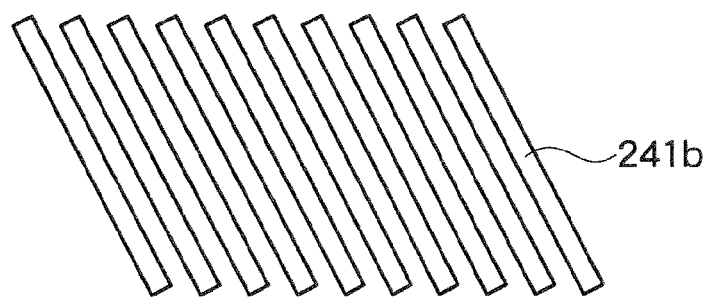
FIG. 8B is a second figure to explain a method for overlapping narrow beams at an inner circumferential brush seal shown in FIG. 6A, and the second figure shows a pattern of second narrow beams.
Figure 8C:
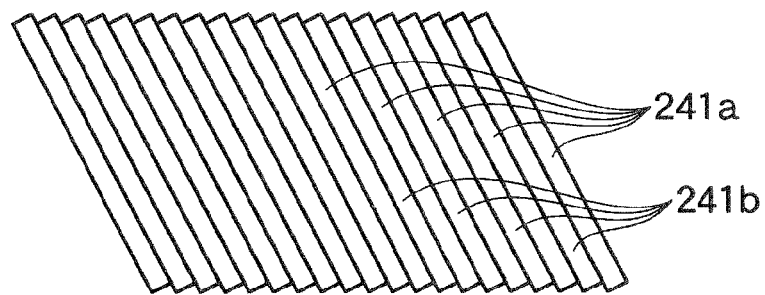
FIG. 8C is a third figure to explain a method for overlapping narrow beams at an inner circumferential brush seal shown in FIG. 6A, and the third figure shows that the first narrow beams shown in FIG. 8A and the second narrow beams shown in FIG. 8B are laminated.

FIG. 5 is a cross sectional view showing a structure of a brush seal device 200 of the second embodiment of the present invention. FIG. 6A is a plane view of a plate brush seal unit disc 311 consisting an inner circumferential brush seal 220 of an inner circumferential brush seal part 201 of the brush seal device 200. FIG. 6B is a plane view of a plate brush seal unit disc 321 consisting an outer circumferential brush seal 240 of an outer circumferential brush seal part 202 of the brush seal device 200. FIG. 7 is a radial-directional cross sectional view of the inner and outer circumferential brush seals 220 and 240 of the brush seal device 200. FIG. 8A and FIG. 8B are figures showing first and second patterns of narrow beams 221 of the inner circumferential brush seal 220. FIG. 8C is a figure showing that they are laminated.

In the following explanation regarding the brush seal device 200 of the second embodiment, the same reference number will be distributed to structures which are substantially the same as those of the brush seal device 100 etc. of the first embodiment mentioned above in reference to FIG. 1 to FIG. 4, and the structures will not be explained. In the second embodiment, parts which are different from those of the brush seal device 100 of the first embodiment will be mainly explained.

As shown in FIG. 5, the brush seal device 200 of the second embodiment basically has the same structures as the brush seal device 100 of the first embodiment.

That is, the brush seal device 100 is placed at a clearance between the housing 810 and the rotational shaft 830, and divides the clearance into the higher pressure side P1 and the lower pressure side P2.

The brush seal device 200 has an inner circumferential brush seal part 201 and an outer circumferential brush seal part 202. The inner circumferential brush seal part 201 has an inner circumferential brush seal 220. The outer circumferential brush seal part 202 has an outer circumferential brush seal 240. The inner circumferential brush seal 220 and the outer circumferential brush seal 240 respectively have brush seal parts 223 and 243 at the inner circumferential side, and tips thereof (inner-circumferential-side end portions) are formed at free end portions 225 and 245.

In the inner circumferential brush seal part 201, the free end portions 225 are placed opposite to an outer circumferential surface 831 of the rotational shaft 830 so as to contact or be adjacent to the outer circumferential surface 831. In the outer circumferential brush seal part 202, the free end portions 245 are placed opposite to an outer circumferential surface 211 of the inner circumferential brush seal part 201 so as to contact or be adjacent to the outer circumferential surface 211 at the outer circumferential side of the inner circumferential brush seal part 201. An outer circumferential surface 212 of the outer circumferential brush seal part 202 is closely fitted with the inner circumferential surface 811 of the housing 810.

With a two-stage brush seal of the inner circumferential brush seal part 201 and the outer circumferential brush seal part 202, the brush seal device 200 axially seals process fluid at the higher pressure side P1 in the space between the housing 810 and the rotational shaft 830.

First, the brush seal device 200 of the second embodiment is different from the brush seal device 100 of the first embodiment in the structures of the inner circumferential brush seal 220 and the outer circumferential brush seal 240.

Each of the brush seals 120 and 140 of the inner and outer circumferential brush seal parts 101 and 102 of the above-mentioned brush seal device 100 of the first embodiment is formed in a ring shape by bundling the multiple linear bristles 121 and 141, arranging the bundled bristles along the circumference in a wall shape, and combining the outer circumferential side, the inner circumferential side, or the middle part with welding.

On the other hand, the inner and outer circumferential brush seals 220 and 240 of the inner and outer circumferential brush seal parts 201 and 202 of the brush seal device 200 of the second embodiment are formed by laminating thin-annular plate brush seal unit discs 311 and 321 as shown in FIG. 6A and FIG. 6B.

The plate brush seal unit discs 311 and 321 respectively have a ring shape. The inner circumferential sides thereof are processed into the narrow beams 221 and 241 inclined with respect to the circumferential direction, and slits 312 and 322 are formed among the narrow beams 221 and 241. The brush portions 313 and 323 constitute the narrow beams 221, 241 and the slits 312, 322 at regular intervals.

Note that, in the plate brush seal unit disc 311 of the inner circumferential brush seal 220, a direction where the slits 312, 322 and the narrow beams 221, 241 are inclined with respect to the circumferential direction is a direction where the rotational shaft 830 rotates. As mentioned below in reference to FIG. 7, an inclined direction, where the narrow beams 221 of the brush seal part 313 of the plate brush seal unit disc 311 are inclined with respect to the radial direction of the rotational shaft 830, that is, the radial direction of the inner and outer circumferential brush seal parts 201 and 202, is opposite to that of the plate brush seal unit disc 321 of the outer circumferential brush seal 240.

The narrow beams 221 and 241 of the plate brush seal unit discs 311 and 321 are bar-shaped (linear, hairy) members having cross sectional shape of rectangle or square whose length of longitudinal and lateral sides is 0.2 to 0.005×0.3 to 0.008 mm, and preferably 0.15 to 0.008×0.2 to 0.01 mm, for example. In addition to rectangle, various shapes such as triangle, trapezoid, or ellipse etc. are used as the cross section of the narrow beams 221 and 241.

Note that, the narrow beams 221 and 241 may be referred as bristles in general.

In the plate brush seal unit discs 311 and 321, the outer circumferential sides of the brush portions 313 and 323 are formed into ring plate shaped base portions 316 and 326 without the slits 312, 322 or the narrow beams 221, 241. The narrow beams 221 and 241 are connected to the base portions 316 and 326. When the plate brush seal unit discs 311 and 321 are laminated to form the inner and outer circumferential brush seals 220 and 240, the multiple laminated plate brush seal unit discs 311 and 321 are welded to be integrated on the base portions 316 and 317.

Here, in terms of a method for laminating the plate brush seal unit discs 311 and 321 using the base portions 316 and 326, an embodiment with different plate brush seal unit discs 311 and 321, that is, different inner and outer circumferential brush seals 220 and 240 will be exemplified.

In the plate brush seal unit discs 311 constituting the inner circumferential brush seal 220 of the inner circumferential brush seal part 201, as shown in FIG. 6A, the base portion 316 is formed with a relatively wide width, and positioning holes 317 are formed along the circumference on the base portion 316.

The pitch of the positioning holes 317 does not correspond to that (pitch of the slits 312) of the narrow beams 221 of the brush portion 313 (the pitch of the positioning holes 317 is not an integral multiple of the pitch of the narrow beams 221), and is formed to be different slightly. Alternatively, pitch (interval) of the respective positioning holes 317 is formed to be slightly different from each other.

When a plurality of the plate brush seal unit discs 311 are laminated, by shifting and matching the positioning holes 317, the pitch of the positioning holes 317 is differently formed so that the position of the narrow beams 221 of the brush portion 313 is slightly displaced by the plate brush seal unit discs 311. Specifically, by properly changing the positioning holes 317 fitted between the plate brush seal unit discs 311, the position of the narrow beams 221 is displaced by a fraction of the pitches of the narrow beams 221.

Thus, when the plurality of the plate brush seal unit discs 311 are laminated to form the inner circumferential brush seal 220, by shifting and matching the positioning holes 317, it is possible to overlap the narrow beams 221 of other plate brush seal unit discs 311 at the slits 312 of a certain plate brush seal unit disc 311. This way of laminating the plurality of the plate brush seal unit discs 311 makes it possible to substantially extinguish slits (space) going through the inner circumferential brush seal 220 in the axial direction and to prevent leakage of process fluid effectively, as the whole inner circumferential brush seal 220.

For example, in the inner circumferential brush seal 220, by laminating the adjacent plate brush seal unit discs 311 as narrow beams 221a and 221b whose pitches are deviated by half as shown in FIG. 8A and FIG. 8B, it is possible to substantially extinguish slits (gaps) going through the inner circumferential brush seal 220 in the axial direction as shown in FIG. 8C.

On the other hand, in the plate brush seal unit discs 321 constituting the outer circumferential brush seal 240 of the outer circumferential brush seal part 202, as shown in FIG. 6B, the base portion 326 is formed with a relatively small width, and positioning holes or so are not formed on the base portion 326.

Thus, when the plurality of the plate brush seal unit discs 321 are laminated to form the outer circumferential brush seal 240, it is impossible to determine the position of plates having the respective outer-circumferential-side slits 322 by using positioning holes like the plate brush seal unit discs 311. However, in other words, in the outer-circumferential-side slits 322, each plate can be laminated to be displaced at optional positions. Then, this way of laminating each plate to be displaced makes it possible to substantially extinguish slits (gaps) going through the outer circumferential brush seal 240 in the axial direction and to prevent leakage of process fluid effectively, as the whole outer circumferential brush seal 240.

That is, in the plate brush seal unit discs 321 without the positioning holes 317, the base portion 316, that is, the plate brush seal unit disc 321 itself can be structured more easily than the plate brush seal unit disc 311. In addition, width of the base portion 326 can be made smaller, and size of the outer circumferential brush seal 240 can be made smaller. Further, the plate brush seal unit discs 321 can be laminated by an optional way of displacement. The plate brush seal unit discs 321 are displaced more freely than the plate brush seal unit discs 311.

In the present embodiment, the inner circumferential brush seal 220 is consisted of the plate brush seal unit discs 311 having the positioning holes 317, and the outer circumferential brush seal 240 is consisted of the plate brush seal unit discs 321 without the positioning holes 317. However, the inner circumferential brush seal 220 may be consisted of plate brush seal unit discs without positioning holes, and the outer circumferential brush seal 240 may be consisted of plate brush seal unit discs having positioning holes. Both the inner circumferential brush seal 220 and the outer circumferential brush seal 240 may be consisted of plate brush seal unit discs having positioning holes. Both of them may be consisted of plate brush seal unit discs without positioning holes.

The plate brush seal unit discs 311 and 321 to be laminated may be laminated with rotational displacement as mentioned above, or may be laminated without rotational displacement. Such a structure may be employed when leakage amount of process fluid can be sufficiently suppressed even if there is a clearance axially going through the inner circumferential brush seal 220 or the outer circumferential brush seal 240.

A material of the plate brush seal unit discs 311 and 321 is steel, stainless, nickel-base alloy, or ceramic material etc. A conventionally known processing method of a fine machining method such as wire electric discharge machining, etching processing, laser processing, or electron beam processing can be applied to the forming of the slits 312, 322 or the positioning holes 317 etc. for the plate brush seal unit discs 311 and 321.

The inner and outer circumferential brush seals 220 and 240 of the brush seal device 200 of the second embodiment are respectively formed by laminating the plate brush seal unit discs 311 and 321 with such a structure at a necessary laminating thickness or number based on a required seal performance. That is, the plurality of the plate brush seal unit discs 311 and 321 are integrated by positioning the plurality of the plate brush seal unit discs 311 and 321 to be laminated as mentioned above, and by performing such as welding of the base portions 316 and 326.

In the plate brush seal unit disc 311 with the positioning holes 317 on the base portion 316 as shown in FIG. 6A, a plurality of the plate brush seal unit discs 311 can be joined by inserting a positioning pin 318 into the positioning holes 317, which position the plurality of the plate brush seal unit discs 311, as shown in FIG. 5, for example. In this case, when the plurality of the plate brush seal unit discs 311 are welded, the positioning pin 318 may be integrally welded. This is effective for prevention of falling off.

Note that, the positioning pin 318 may be stood on the back plate part 130 in advance, and each of the plate brush seal unit discs 311 may be positioned for the positioning pin 318 placed on the back plate part 330 when the plurality of the plate brush seal unit discs 311 are laminated. In this case, a step for laminating the plurality of the plate brush seal unit discs 311 and a step for placing the back plate part 130 and the holding part 135 are simultaneously performed in substantially the same step. Therefore, the positioning pin 318 may become easy to be handled, and both the step for laminating the plate brush seal unit discs 311 and the step for placing the back plate part 130 and the holding part 135 may become easy steps. The brush seal device 200 may be performed with such a structure and method.

In the plate brush seal unit disc 321 without positioning holes on the base portion 326 as shown in FIG. 6B, a plurality of the plate brush seal unit discs 321 are joined by merely welding the base portion 326 of the respective plate brush seal unit discs 321 while they are maintained to be positioned as desired.

Note that, in the inner and outer circumferential brush seals 220 and 240 as formed in this way, welded parts of the base portions 316 and 326 may be referred as attachment sections 222 and 242 hereinafter.

As mentioned above, the brush seal device 200 has the inner and outer circumferential brush seal parts 201 and 202. In addition to the inner circumferential brush seal 220 comprised of the plate brush seal unit discs 311 as mentioned above, the inner circumferential brush seal part 201 has the back plate part 130 and the holding part 135. In addition to the outer circumferential brush seal 240 comprised of the inner-circumferential-side slits 312 as mentioned above, the outer circumferential brush seal part 202 has a back plate part 250 and a holding part 255.

In terms of the inner circumferential brush seal part 201, the back plate part 130 and the holding part 135 are constituted in the same way as the brush seal device 100 of the first embodiment. That is, the back plate part 230, the inner circumferential brush seal 220, and the holding part 135 are welded by centering the attachment section 222 of the inner circumferential brush seal 220 and are combined as in a trinity to form the inner circumferential brush seal part 201.

In terms of the outer circumferential brush seal part 202, structure, function, effect and the like of the back plate part 250 and the holding part 255 are the same as those of the back plate part 130 and the holding part 135 of the inner circumferential brush seal part 201 (the back plate part 130 and the holding part 135 of the inner circumferential brush seal part 101 of the brush seal device 100 of the first embodiment). The back plate part 250, the outer circumferential brush seal 240, and the holding part 255 are welded by centering the attachment section 242 of the outer circumferential brush seal 240 and combined as in a trinity to form the outer circumferential brush seal part 202.

Function, movement, and effect of the free end portions 225, 245 of the respective brush portions 223, 243 of the inner and outer circumferential brush seals 220, 240 of the inner and outer circumferential brush seal parts 201, 202 of the brush seal device 200 are the same as those of the free end portions 125, 145 of the respective brush portions 123, 143 of the brush seals 120, 140 of the respective brush seal parts 101, 102 of the brush seal device 100 of the first embodiment mentioned above.

Note that, in the present embodiment, the brush portions 223, 243 of the inner and outer circumferential brush seals 220, 240 of the inner and outer circumferential brush seal parts 201, 202 are the same brush portions. That is, the narrow beams 221 consisting the inner circumferential brush seal 220 and the narrow beams 241 consisting the outer circumferential brush seal 240 are consisted to have the same material, cross sectional shape, size thereof, characteristic such as elastic characteristic, arrangement density, or arrangement form.

In the brush seal device 100 of the first embodiment, the brush receiving part 190 is placed on the outer circumferential surface 111 of the inner circumferential brush seal part 101, which prevents spreading of the free end portions 145 of the bristles 141 of the outer circumferential brush seal 140 of the outer circumferential brush seal part 102.

On the other hand, in the brush seal device 200 of the second embodiment, the brush receiving part 190 is not provided, and the free end portions 245 of the brush portion 243 of the outer circumferential brush seal 240 are directly contacted to the outer circumferential surface 211 of the inner circumferential brush seal part 201.

In the brush seal device 200, instead of the first and second holding parts 150 and 155 of the brush seal device 100, the back plate part 250 and the holding part 255 hold the outer circumferential brush seal 240 therebetween, and side surfaces of the narrow beams 241 of the outer circumferential brush seal 240 are supported as shown in FIG. 5. That is, in the brush seal device 200, the back plate part 250 and the holding part 255 hold an area therebetween including root portions of the outer circumferential brush seal 240 near the attachment section 242 by centering the attachment section (base portion) 242 as mentioned above. As a result, in the brush seal device 200, the back plate part 250 and the holding part 255 prevent spreading of the narrow beams 241 of the outer circumferential brush seal 240. Thus, it is not necessary to provide a member like the brush receiving part 190 at the part of the free end portions 245 of the outer circumferential brush seal 240.

Note that, such an embodiment of holding the root portions of the outer circumferential brush seal 240 with the back plate part 250 and the holding part 255 therebetween can be also applied to the bristles 141 of the outer circumferential brush seal 140 of the brush seal device 100 of the first embodiment mentioned above.

FIG. 7 shows a radial-directional cross sectional view at the inner and outer circumferential brush seals 220 and 240 of the brush seal device 200. As shown in FIG. 7 and as mentioned above, in the brush seal device 200 of the present embodiment, the narrow beams 241 of the outer circumferential brush seal 240 are inclined with respect to a direction opposite to that of the narrow beams 221 of the inner circumferential brush seal 220 inclined with respect to the radial direction of the rotational shaft 830. In this structure, the tilt angle and length of the narrow beams 221 and 241 are adjusted so that spring effect generated by the narrow beams 241 and 221 of the outer and inner circumferential brush seals 240 and 220 remains only as the radial direction element F of the brush seal device 200.

In accordance with such a structure, there is only a force in the radial direction with respect to stress (shaking stress) for such as vibration which the brush seal device 200 receives from the rotational shaft 830. Thus, behavior such as an unstable vibration of the brush seal device 200 can be prevented, and the movement of the brush seal device 200 can be stabilized.

Note that, the features of the tilt angle and length of the narrow beams 221 and 241 can be also applied to a relation of the bristles 121, 141 of the inner and outer circumferential brush seals 120, 140 of the brush seal device 100 of the first embodiment mentioned above.

The brush seal device 200 of the second embodiment has such a structure.

Therefore, in the second embodiment, the following brush seal device can be also provided: Leakage of process fluid from around a rotational shaft and from an outer circumferential side can be prevented; wear of a brush seal, the rotational shaft or a housing etc. can be prevented; and these function and effect can be properly maintained for a long time.

Note that, in the present embodiment, the brush portions 223, 243 of the inner and outer circumferential brush seals 220, 240 of the inner and outer circumferential brush seal parts 201, 202 are the same brush portions. However, they can be consisted as different brush portions. Specifically, they become different brush portions by processing the narrow beams 221 constituting the brush seal 220 and the narrow beams 241 constituting the outer circumferential brush seal 240 to have different cross sectional shape, size of cross section, characteristic such as elastic characteristic, arrangement density, or arrangement form etc. As a result, it is possible to provide a brush seal device which is applicable to a wider technical field and performs a higher performance.

In the brush seal device 200, the inner and outer circumferential brush seal parts 201, 202 may be integrated in advance before the brush seal device 200 is placed in the housing 810, or may be separated until the brush seal device 200 is placed in the housing 810 and be integrated when they are placed in the housing 810 (when they are assembled).

Third Embodiment

A brush seal device of the third embodiment of the present invention will be explained in reference to FIG. 9 to FIG. 12.

The brush seal device of the third embodiment will be explained as a variation of the brush seal device 200 of the second embodiment.

In the brush seal device 200 mentioned above as the second embodiment, the brush seals 220, 240 (the inner and outer circumferential brush seals 220, 240) are constituted by laminating the same plate brush seal unit discs 311, 321. However, the brush seals 220, 240 may be constituted by laminating different types of plate brush seal unit discs.

Especially, the outer circumferential brush seal 240 is formed by laminating various types of the plate brush seal unit discs 321 having different forms of the narrow beams 241, which can reduce the clearance in the axial direction of the brush portion 243 of the outer circumferential brush seal 240.

Figure 9A:
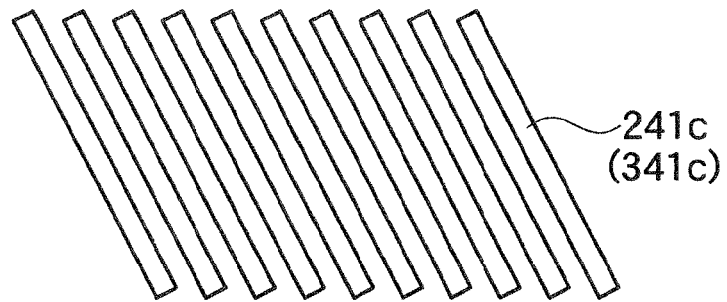
FIG. 9A is a first figure showing a first example of overlapping of narrow beams at an outer circumferential brush seal as a brush seal device of the third embodiment of the present invention, and the first figure shows a pattern of first narrow beams.
Figure 9B:
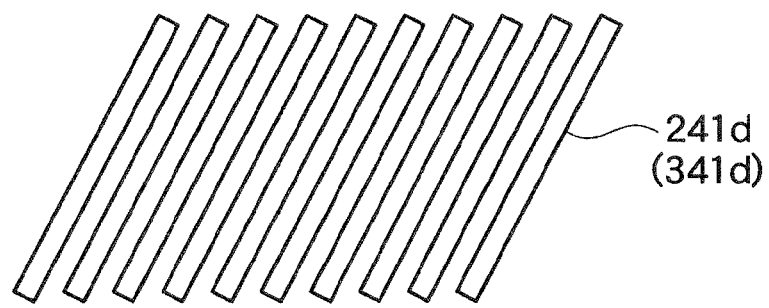
FIG. 9B is a second figure showing a first example of overlapping of narrow beams at an outer circumferential brush seal as a brush seal device of the third embodiment of the present invention, and the second figure shows a pattern of second narrow beams.
Figure 9C:
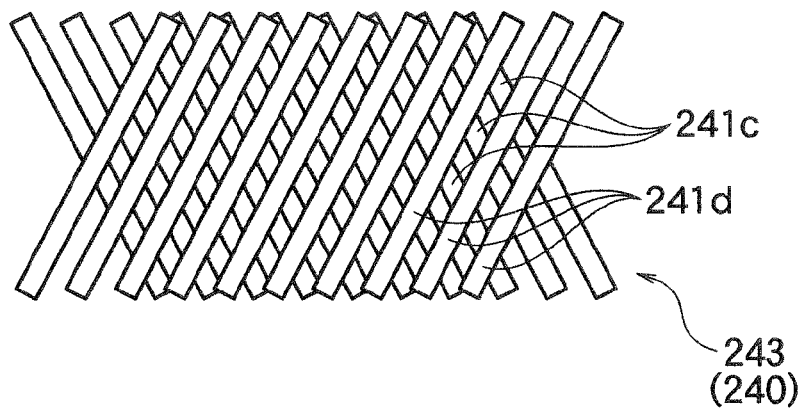
FIG. 9C is a third figure showing a first example of overlapping of narrow beams at an outer circumferential brush seal as a brush seal device of the third embodiment of the present invention, and the third figure shows that the first narrow beams shown in FIG. 9A and the second narrow beams shown in FIG. 9B are laminated.

For example, as shown in FIG. 9A and FIG. 9B, two types of the plate brush seal unit discs 321c, 321d having narrow beams 241c, 241d whose tilt directions are different are laminated, which makes the brush portion 243 of the outer circumferential brush seal 240 have a form as shown in FIG. 9C and makes the clearance in the axial direction smaller.

Figure 10A:
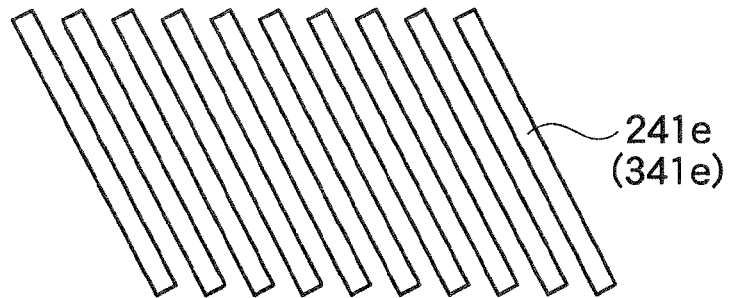
FIG. 10A is a first figure showing a second example of overlapping of narrow beams at an outer circumferential brush seal as a brush seal device of the third embodiment of the present invention, and the first figure shows a pattern of first narrow beams.
Figure 10B:
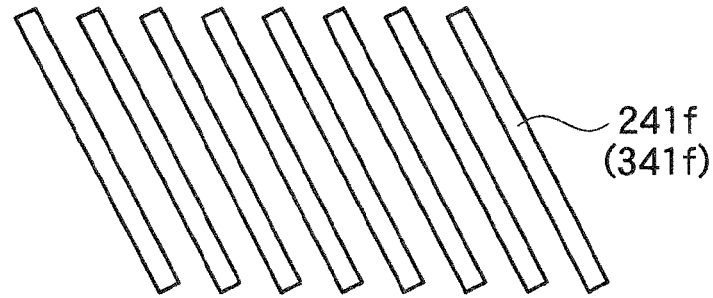
FIG. 10B is a second figure showing a second example of overlapping of narrow beams at an outer circumferential brush seal as a brush seal device of the third embodiment of the present invention, and the second figure shows a pattern of second narrow beams.
Figure 10C:
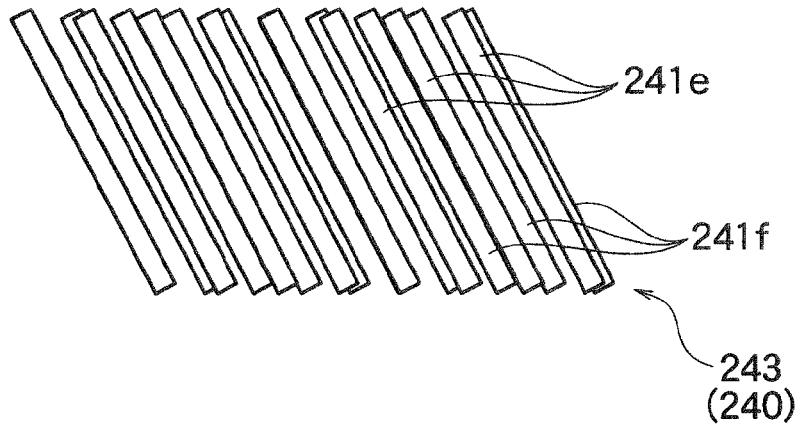
FIG. 10C is a third figure showing a second example of overlapping of narrow beams at an outer circumferential brush seal as a brush seal device of the third embodiment of the present invention, and the third figure shows that the first narrow beams shown FIG. 10A and the second narrow beams shown in FIG. 10B are laminated.

As shown in FIG. 10A and FIG. 10B, two types of the plate brush seal unit discs 321e, 321f having narrow beams 241e, 241f whose pitches are different are laminated, which makes the brush portion 243 of the outer circumferential brush seal 240 have a form as shown in FIG. 10C and makes the clearance in the axial direction smaller in this structure as well.

Figure 11A:
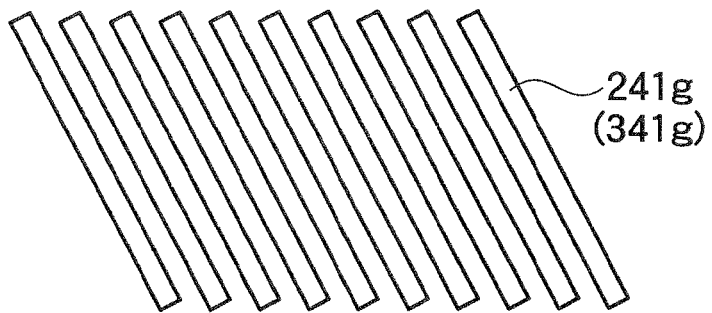
FIG. 11A is a first figure showing a third example of overlapping of narrow beams at an outer circumferential brush seal as a brush seal device of the third embodiment of the present invention, and the first figure shows a pattern of first narrow beams.
Figure 11B:
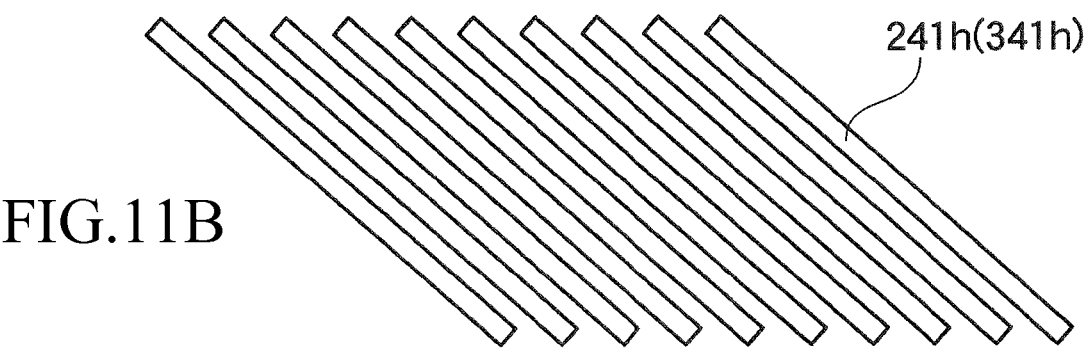
FIG. 11B is a second figure showing a third example of overlapping of narrow beams at an outer circumferential brush seal as a brush seal device of the third embodiment of the present invention, and the second figure shows a pattern of second narrow beams.
Figure 11C:
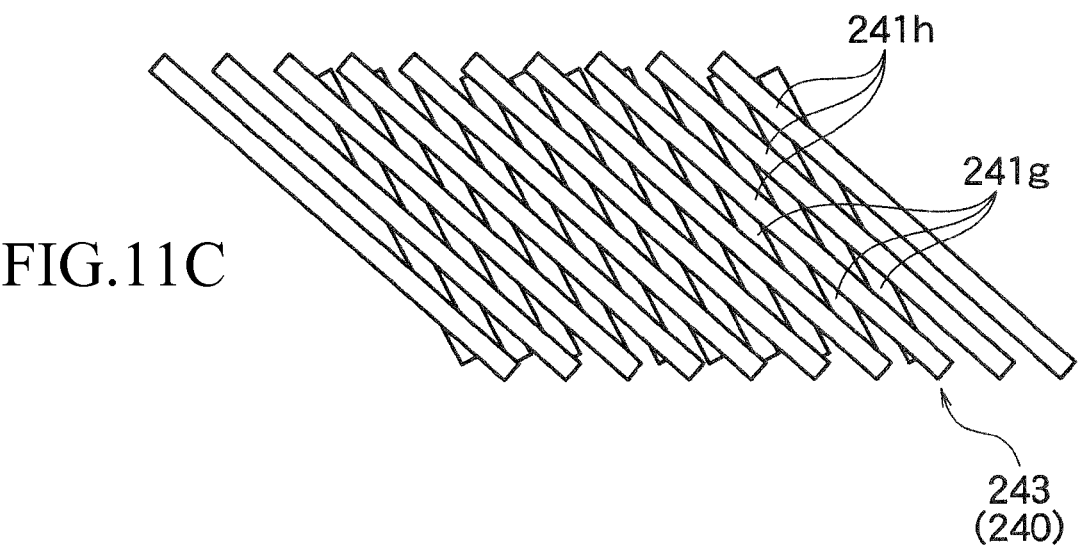
FIG. 11C is a third figure showing a third example of overlapping of narrow beams at an outer circumferential brush seal as a brush seal device of the third embodiment of the present invention, and the third figure shows that the first narrow beams shown in FIG. 11A and the second narrow beams shown in FIG. 11B are laminated.

Further, as shown in FIG. 11A and FIG. 11B, two types of the plate brush seal unit discs 321g, 321h having narrow beams 241g, 241h whose tilt angles are different are laminated, which makes the brush portion 243 of the outer circumferential brush seal 240 have a form as shown in FIG. 11C and makes the clearance in the axial direction smaller in this structure as well.

Since the clearance in the axial direction of the narrow beams 241 of the outer circumferential brush seal 240 becomes small in all the structures, it is possible to reduce or prevent the leakage of process fluid around the outer circumference of the brush seal device 200, and this is preferable.

The brush seal device of the third embodiment has such a structure.

Function, effect, variation or the like regarding the brush seal device of the respective embodiments mentioned above is also applicable to the brush seal device explained as the third embodiment. Therefore, in the third embodiment, the following brush seal device can be also provided: Leakage of process fluid from around a rotational shaft and from an outer circumferential side can be prevented; wear of a brush seal, the rotational shaft, or a housing etc. can be prevented; and these function and effect can be properly maintained for a long time.

Note that, in order to have different forms of the narrow beams 241, there are various methods and forms in addition to the above, and an optional method may be applied.

The structure is not limited to a form which narrow beams are formed on plate brush seal unit discs and they are laminated. The structure is also applicable to one forming an outer circumferential brush seal with the bristles explained as the first embodiment.

The same method is also applicable to the inner circumferential brush seal 220. In that structure, it is possible to reduce or prevent the leakage of process fluid at the brush portion 223 of the inner circumferential brush seal 220, and this is preferable.

Fourth Embodiment

The fourth embodiment of the present invention will be explained in reference to FIG. 12.

In the following explanation regarding a brush seal device 500 of the fourth embodiment, the same reference number will be distributed to structures which are substantially the same as those of the brush seal devices of each embodiment mentioned above, and the structures will not be explained.

In the brush seal devices of each embodiment mentioned above, the inner circumferential brush seals 120, 220 and the outer circumferential brush seals 140, 240 are provided so that a direction of the bristles 121, 141 or the narrow beams 221, 241 is along the radial direction of the rotational shaft 830.

On the other hand, the brush seal device 500 of the fourth embodiment provides an outer circumferential brush seal 540 inclined in the axial direction.

Hereinafter, the brush seal device 500 of the fourth embodiment will be explained in detail in reference to the figure.

Figure 12:
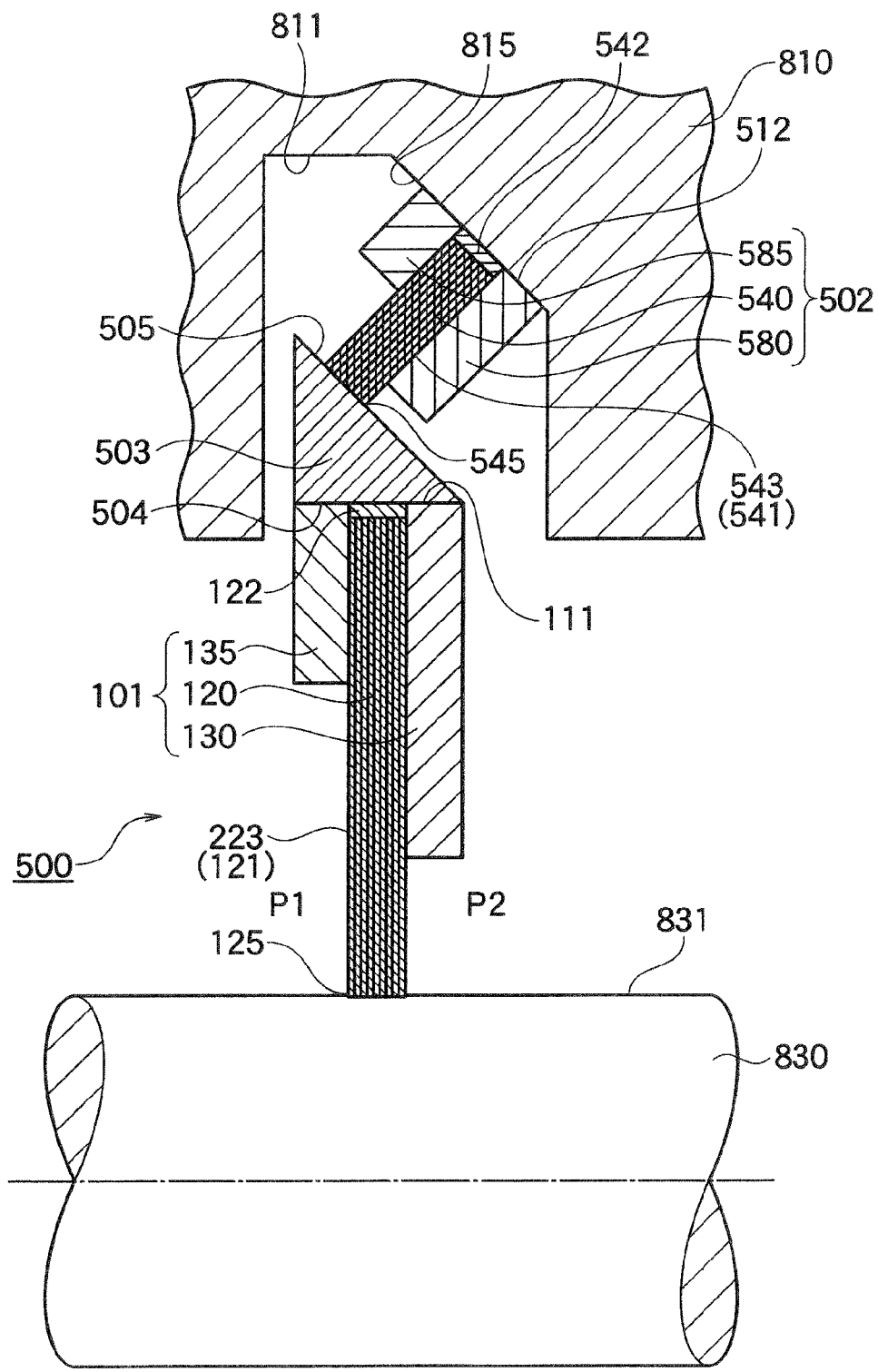
FIG. 12 is a cross sectional view showing a structure of a brush seal device of the fourth embodiment of the present invention.

As shown in FIG. 12, the brush seal device 500 of the present embodiment is also one which separates the gap between the housing 810 of such as a gas turbine and the rotational shaft 830 to the higher pressure side P1 and the lower pressure side P2, for example. The brush seal device 500 is attached on an inclined surface 815, which is provided on the inner circumferential surface 811 of the housing 810. The inclined surface 815 is a surface inclined with respect to the inner circumferential surface 811 at approximately 45 degrees.

The brush seal device 500 has the inner circumferential brush seal part 101, an outer circumferential brush seal part 502, and a connection part 503.

The inner circumferential brush seal part 101 has the inner circumferential brush seal 120, the back plate part 130 and the holding part 135, and has the same structure as the inner circumferential brush seal part 101 of the first embodiment mentioned above.

The outer circumferential brush seal part 502 has the outer circumferential brush seal 540, a back plate part 580, and a holding part 585.

The outer circumferential brush seal 540 of the outer circumferential brush seal part 502 has approximately the same structure as the outer circumferential brush seal 140 of the brush seal device 100 of the first embodiment. However, the entire shape thereof is not a plain annular shape like the outer circumferential brush seal 140 of the first embodiment, but is a truncated conical body (a truncated cone) shape as shown in FIG. 12. That is, the outer circumferential brush seal 540 is formed into a truncated shape by bundling the multiple linear bristles 541, arranging the bundled bristles 541 along the truncated cone side circumferential shape in a wall shape, and combining an outer-circumferential-side end portion 542 with welding. Then, the inner circumferential side of the welding part 542 is formed at a brush portion 543, and free end portions 545 are formed at the tip thereof.

The outer circumferential brush seal 540 is held by the back plate part 580 and the holding part 585 therebetween and is integrated therewith to obtain the outer circumferential brush seal part 502.

The back plate part 580 is a member which has the same truncated conical shape (a truncated cone) as the outer circumferential brush seal 540 and is placed at the lower pressure side P2 of the outer circumferential brush seal 540. The back plate part 580 supports the bristles 541 of the outer circumferential brush seal 540 from the lower pressure side P2.

The holding part 585 is a member which has the same truncated conical shape (a truncated cone) as the outer circumferential brush seal 540 and is placed at the higher pressure side P1 of the outer circumferential brush seal 540. The holding part 585 is a member for holding the outer circumferential brush seal 540 with the back plate part 580.

The back plate part 580 and the holding part 585 are arranged to hold the outer circumferential brush seal 540 therebetween, and are welded by centering the outer-circumferential-side welding part 542 of the outer circumferential brush seal 540. Then, they are combined as in a trinity and formed into the outer circumferential brush seal part 502.

The material of the back plate part 580 and the holding part 585 is the same as that of the back plate part 130, the holding part 135 or the like of the first embodiment.

In each part of the annular-shaped outer circumferential brush seal part 502, as FIG. 2 shows the cross section, although an outer circumferential surface 512 is formed to be vertical to each plate surface of an outer circumferential brush seal 520, the back plate part 580 and the holding part 585, the outer circumferential brush seal part 502 is formed in a truncated conical shape as a whole. Thus, as a whole of the outer circumferential brush seal part 502, the outer circumferential surface 512 is a surface inclined with respect to the outer circumferential surface 831 of the rotational shaft 830 or the inner circumferential surface 811 of the housing 810. Then, in the outer circumferential brush seal part 502, the tilt angle of the outer circumferential surface 512 with respect to the inner circumferential surface 811 of the housing 810 is the same as that of the inclined surface 815 of the housing 810, and the outer circumferential surface is formed to be opposite to the inclined surface 815 of the housing 810 in parallel.

As shown in FIG. 12, the connection part 503 is a ring member whose cross section is triangle. The connection part 503 has an inner circumferential surface 504 and an inclined surface 505, which is parallel to the inclined surface 815 formed on the inner circumferential surface 811 of the housing 810.

The inner diameter of the connection part 503 is formed to be approximately the same as the outer diameter of the inner circumferential brush seal part 101. The length (thickness) in the axial direction of the connection part 503 is approximately the same as the length (thickness) in the axial direction of the inner circumferential brush seal part 101. The inner circumferential brush seal part 101 is fitted and joined with the inner circumferential surface 504 of the connection part 503 as illustrated, and the connection part 503 is integrated with the inner circumferential brush seal part 101.

As shown in FIG. 12, the brush seal device 500 with such a structure is placed between the housing 810 and the rotational shaft 830. In the brush seal device 500, the outer circumferential surface 512 of the outer circumferential brush seal part 502 is fixed and placed on the inclined surface 815 of the inner circumferential surface 811 of the housing 810.

Further, the inclined surface 505 of the connection part 503, which is placed on the outer circumferential surface 111 of the inner circumferential brush seal part 101 fitted and placed on the rotational shaft 830, is approximately vertically contacted to the free end portions 545 of the bristles 541 of the outer circumferential brush seal 540 of the outer circumferential brush seal part 502.

The free end portions 125 of the bristles 121 of the inner circumferential brush seal 120 of the inner circumferential brush seal part 101 are arranged to be adjacent to the outer circumferential surface 831 of the rotational shaft 830, and seal the clearance near the rotational shaft 830 between the higher pressure side P1 and the lower pressure side P2. Further, free end portions 525 of bristles 521 of the outer circumferential brush seal 540 of the outer circumferential brush seal part 502 are arranged to be adjacent to the inclined surface 505 of the connection part 503, and seal the clearance near the connection part 503 between the higher pressure side P1 and the lower pressure side P2.

Function, movement, and effect of the brush portions 123, 543 and the free end portions 125, 545 of the inner and outer circumferential brush seals 120, 540 of the inner and outer circumferential brush seal parts 101, 502 of the brush seal device 500 are the same as those of the brush seal devices of each embodiment mentioned above.

Especially in the brush seal device 500, the outer circumferential brush seal 540 of the outer circumferential brush seal part 502 is provided to be inclined with respect to the axial direction of the rotational shaft 830. Thus, the brush seal device 500 can follow not only the movement in the radial direction of the rotational shaft 830, but also the movement in the axial direction.

The brush seal device 500 of the fourth embodiment has such a structure.

All of function, effect, variation and the like of the brush seal device of the respective embodiments mentioned above are also applicable to the brush seal device 500 of the fourth embodiment. Therefore, in the fourth embodiment, the following brush seal device can be also provided: Leakage of process fluid from around a rotational shaft and from an outer circumferential side can be prevented: wear of a brush seal, the rotational shaft, or a housing etc. can be prevented; and these function and effect can be properly maintained for a long time.

In the brush seal device 500 of the present embodiment, where the outer circumferential brush seal 520 and the outer circumferential brush seal 540 are inclined with respect to the axial direction of the rotational shaft 830, it is possible to provide the following brush seal device: Displacement in the axial direction of the rotational shaft 830 can be followed; a more stable operation can be performed, and as a result, leakage of process fluid can be more securely prevented; wear of each part can be prevented; and a long term use is possible.

Note that, in the present embodiment, the inner and outer circumferential brush seals 120, 540 with the bristles 121, 541 are exemplified, but a brush seal constituted by laminating plate brush seal unit discs as the second embodiment may be used.

In the present embodiment, the outer circumferential brush seal 540 is inclined at 45 degrees, but it may be inclined at an optional degree based on an application target, pressure of process fluid, strength of stress in each direction, vibration, form or size of deviation, or the like.

Fifth Embodiment

Figure 13A:
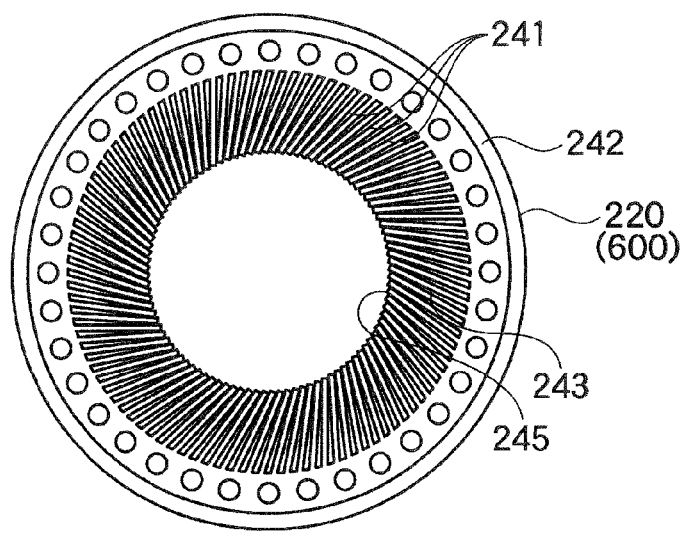
FIG. 13A is a first figure showing a structure of a brush seal device of the fifth embodiment of the present invention, and the first figure shows an inner circumferential brush seal of an inner circumferential brush seal part.
Figure 13B:
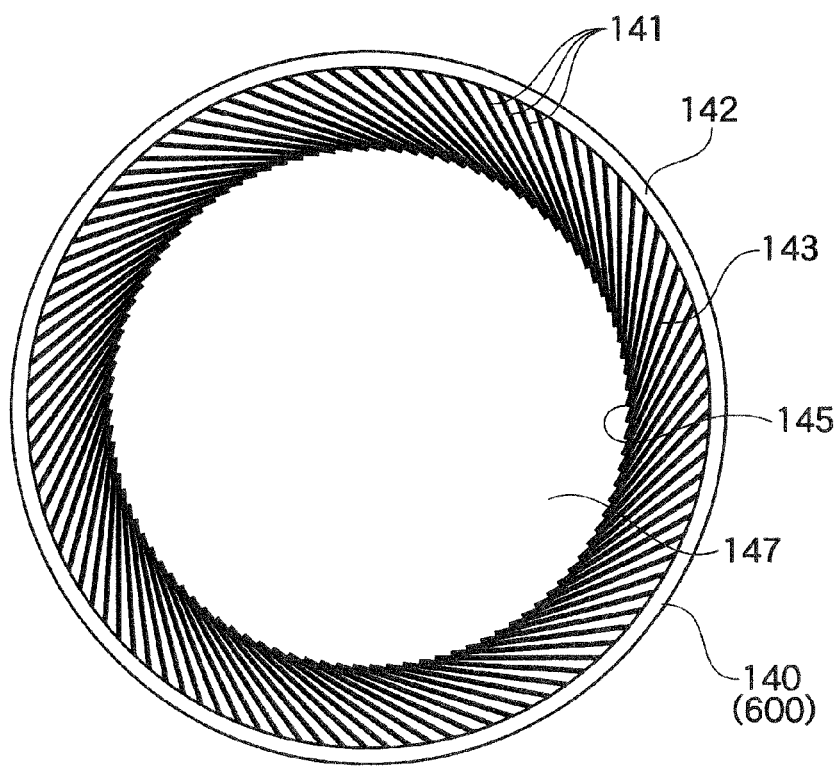
FIG. 13B is a second figure showing a structure of a brush seal device of the fifth embodiment of the present invention, and the second figure shows an outer circumferential brush seal of an outer circumferential brush seal part.

The fifth embodiment of the present invention will be explained in reference to FIG. 13A and FIG. 13B.

In the following explanation regarding a brush seal device 600 of the fifth embodiment, the same reference number will be also distributed to structures which are substantially the same as those of the brush seal devices of each of the above-mentioned embodiments, and the structures will not be explained, either.

The brush seals of each embodiment mentioned above are constituted by commonly using either an embodiment of bundling and welding bristles or an embodiment of laminating plate brush seal unit discs as the inner and outer circumferential brush seals of the inner and outer circumferential brush seal parts. However, the inner and outer circumferential brush seals may employ different embodiments. In the present embodiment, the brush seal device 600, which uses both a brush seal with the laminated plate brush seal unit discs as the inner circumferential brush seal and a brush seal with bristles as the outer circumferential brush seal, will be explained.

The brush seal device 600 of the present embodiment has inner and outer circumferential brush seal parts as with each embodiment mentioned above. As shown in FIG. 13A and FIG. 13B, the brush seal device 600 has the inner circumferential brush seal 220 of the second embodiment mentioned above as the inner circumferential brush seal of the inner circumferential brush seal part. Further, the brush seal device 600 has the outer circumferential brush seal 140 of the first embodiment mentioned above as the outer circumferential brush seal of the outer circumferential brush seal part. Both of them have completely the same structures as those of the inner and outer circumferential brush seals 220 and 140 in detail.

Note that, here, only the brush seal will be illustrated, and back plate parts, holding parts and the like will not be illustrated.

The brush seal device 600 is constituted as follows: The inner circumferential brush seal part having the inner circumferential brush seal 220 is placed on the outer circumferential surface 831 of the rotational shaft 830; the outer circumferential brush seal part having the outer circumferential brush seal 140 is placed on the inner circumferential surface 811 of the housing 810; and the free end portions 145 of the bristles 143 of the outer circumferential brush seal 140 are arranged to be adjacent to the outer circumferential surface of the inner circumferential brush seal part having the inner circumferential brush seal 220.

The brush seal device 600 of the fifth embodiment has such a structure.

Function, effect, variation or the like regarding the brush seal device of the respective embodiments mentioned above is also applicable to the brush seal device 600 explained as the fifth embodiment. Therefore, in the fifth embodiment, the following brush seal device can be provided: Leakage of process fluid from around a rotational shaft and from an outer circumferential side can be prevented; wear of a brush seal, the rotational shaft, or a housing etc. can be prevented; these function and effect can be properly maintained for a long time.

Especially, the brush seal device 600 of the present embodiment uses both the brush seal 220, where plate brush seal unit discs are laminated, as the inner circumferential brush seal and the brush seal 140 formed with bristles as the outer circumferential brush seal. In this way, by combining optional brush seals, it is possible to form brush portions having various movement conditions and movement characteristics and to form brush portions having optimal conditions respectively as the inner and outer circumferential brush seals. As a result, it is possible to provide a brush seal device which is applicable to a wider technical field and performs a higher performance.

Note that, the present invention is not limited to the embodiments mentioned above, but can be variously changed within a scope thereof.

INDUSTRIAL APPLICATION FIELD

The brush seal according to the present invention can be preferably used for an optional device having a rotational shaft of aircrafts, gas turbines and the like.

The invention claimed is:

1. A brush seal device having a brush portion in which a plurality of bristles are arranged and sealing in an axial direction between a housing and a rotational shaft, the brush seal device comprising:
   an inner circumferential brush seal part having an inner circumferential brush seal; and
   an outer circumferential brush seal part having an outer circumferential brush seal, wherein
   said inner circumferential brush seal comprises:
   an attachment section provided at an outer circumferential side;
   a brush portion in which a plurality of bristles are arranged from the attachment section to an inner circumferential direction; and
   a free end portion which is an inner-circumferential-side end portion of the brush portion and is arranged opposite to an outer circumferential surface of the rotational shaft so as to contact or be adjacent to the outer circumferential surface, and
   said outer circumferential brush seal comprises:
   an attachment section provided at an outer circumferential side;
   a brush portion in which a plurality of bristles are arranged from the attachment section to an inner circumferential direction; and
   a free end portion which is an inner-circumferential-side end portion of the brush portion and is arranged opposite to an outer circumferential surface of the inner circumferential brush seal part so as to contact or be adjacent to the outer circumferential surface.

2. The brush seal device as set forth in claim 1, wherein at least one of said inner circumferential brush seal and said outer circumferential brush seal is a brush seal having a seal part and the free end portion formed on an inner circumferential side of a plurality of wire members bundled and arranged in a wall shape along a circumference and formed into a ring shape by welding an outer end portion of the wire members combined to one another.

3. The brush seal device as set forth in claim 1, wherein at least one of said inner circumferential brush seal and said outer circumferential brush seal comprises a plurality of plate brush seal unit discs integrally formed by axially laminating themselves,
   the plate brush seal unit disc comprises:
   the attachment section;
   the brush portion having narrow beams as the bristles extending from the attachment section to an inner circumferential side and inclined with respect to a circumferential direction; and
   the free end portion.

4. The brush seal device as set forth in claim 1, wherein the brush portion of the inner circumferential brush seal and the brush portion of the outer circumferential brush seal are composed of bristles of the same material.

5. The brush seal device as set forth in claim 1, wherein the brush portion of the inner circumferential brush seal and the brush portion of the outer circumferential brush seal are composed of bristles of different materials.

6. The brush seal device as set forth in claim 1, wherein a plurality of the bristles of the inner-circumferential-side brush portion of the inner circumferential brush seal are arranged toward an inner circumferential direction to be inclined with respect to a radial direction,
   a plurality of the bristles of the outer-circumferential-side brush portion of the outer circumferential brush seal are arranged toward an inner circumferential direction to be inclined with respect to a radial direction, and
   the bristles of the inner circumferential brush seal and the bristles of the outer circumferential brush seal are inclined oppositely with respect to the radial direction.

7. The brush seal device as set forth in claim 1, further comprising:
   a brush receiving part placed on the outer circumferential surface of the inner circumferential brush seal part so as to contact or be adjacent to the free end portion of the outer circumferential brush seal and to restrict a spreading out in an axial direction of the free end portion of the outer circumferential brush seal.

8. The brush seal device as set forth in claim 1, wherein the outer circumferential brush seal is formed to be inclined with respect to the axial direction of the rotational shaft.

* * * * *